United States Patent [19]

Squibb

[11] Patent Number: 5,745,906

[45] Date of Patent: Apr. 28, 1998

[54] METHOD AND APPARATUS FOR MERGING DELTA STREAMS TO RECONSTRUCT A COMPUTER FILE

[75] Inventor: Mark Squibb, Republic, Mo.

[73] Assignee: DeltaTech Research, Inc., Montreal, Canada

[21] Appl. No.: 557,586

[22] Filed: Nov. 14, 1995

[51] Int. Cl.$^6$ ..................................... G06F 17/30
[52] U.S. Cl. ................. 707/203; 707/204; 707/3; 707/4; 707/6
[58] Field of Search ................ 395/619, 604, 395/603, 608, 617; 707/203, 3, 4, 204, 6

[56] References Cited

U.S. PATENT DOCUMENTS

| | | | |
|---|---|---|---|
| 4,807,182 | 2/1989 | Queen | 364/900 |
| 4,853,843 | 8/1989 | Ecklund | 364/200 |
| 4,912,637 | 3/1990 | Sheedy et al. | 395/619 |
| 5,131,012 | 7/1992 | Dravida | 375/108 |
| 5,218,605 | 6/1993 | Low et al. | 371/16.1 |
| 5,278,979 | 1/1994 | Foster et al. | 395/600 |
| 5,317,729 | 5/1994 | MukherJee et al. | 395/600 |
| 5,317,731 | 5/1994 | Dias et al. | 395/608 |
| 5,347,653 | 9/1994 | Flynn et al. | 394/600 |
| 5,438,661 | 8/1995 | Ogawa | 395/157 |
| 5,446,884 | 8/1995 | Schwendemann et al. | 395/600 |
| 5,479,654 | 12/1995 | Squibb | 395/600 |
| 5,559,991 | 9/1996 | Kanfi | 395/489 |
| 5,581,755 | 12/1996 | Koerber et al. | 395/614 |
| 5,592,661 | 1/1997 | Eisenberg et al. | 395/600 |
| 5,680,613 | 10/1997 | Korenshtein | 395/705 |

OTHER PUBLICATIONS

United States Patent Application Serial No. 08/039,702 filed Mar. 30, 1993, now U.S. Patent No. 5,479,654.

*Primary Examiner*—Thomas G. Black
*Assistant Examiner*—Jean R. Homere

[57] ABSTRACT

A computer apparatus and method for merging a sequential plurality of delta streams, wherein each delta stream represents a change to either a prior delta stream, an original data stream, or an updated data stream. The method and apparatus may be used to 1) merge a sequential plurality of delta streams with an original data stream to create an updated data stream, 2) merge a sequential plurality of delta streams to create a compiled delta stream, or 3) merge a sequential plurality of negative delta streams to retrieve a desired prior data stream. The method and apparatus may be used in conjunction with a computer backup process, version manager, or the like. In summary, a consumer process initiates a number of search requests, within a transaction chain corresponding to the sequential plurality of delta streams, for a number of data bytes to transfer to an updated data stream. The search requests may be fulfilled with data bytes provided by the last delta stream in the transaction chain capable of supplying data bytes, or if the sequential plurality of delta streams is incapable of fulfilling the search request, it may be fulfilled with data bytes provided by the original data stream. As the sequential plurality of delta streams is merged, a sequential plurality of negative delta streams may be generated, thus enabling reconstruction of a desired prior data stream.

56 Claims, 13 Drawing Sheets

Microfiche Appendix Included
(1 Microfiche, 30 Pages)

DELTA STREAMS

DELTA STREAM 0

246 —[ 0  0  9]
248 —[RADICAL_]
250 —[10 18 27]

DELTA STREAM 1

252 —[ 0  0  4]
254 —[COULDN'T_BE_A_]
256 —[10 29 36]

DELTA STREAM 2

258 —[ 0  0  9]
260 —[_B]
262 —[15 12 26]
264 —[T.]

NEGATIVE DELTA STREAMS

266 —[ 0  0  9]
268 —[18 10 19]

270 —[ 0  0  4]
314 —[*****]
274 —[19 10 27]

276 —[ 0  0  9]
278 —[N'T_B]
280 —[12 15 29]
316 —[*******]

COMPILED DELTA STREAM

318 —[ 0  0  4]
320 —[COULD]
322 —[_B]
324 —[E_A_]
326 —[RADICAL_]
328 —[10 24 26]
330 —[T.]

FIG. 14

METHOD AND APPARATUS FOR MERGING DELTA STREAMS TO RECONSTRUCT A COMPUTER FILE

CROSS-REFERENCE TO RELATED APPLICATION

This application hereby incorporates by reference the U.S. patent application of Squibb, Ser. No. 08/039,702 filed Mar. 30, 1993, now U.S. Pat. No. 5,479,654.

REFERENCE TO MICROFICHE APPENDIX

This application also incorporates by reference the computer program listing contained in the attached microfiche appendix. The microfiche appendix comprises 1 microfiche with 30 frames.

BACKGROUND OF THE INVENTION

This invention pertains to a computer apparatus and method for merging a sequential plurality of delta streams, wherein each delta stream represents a change to either a prior delta stream or an original data stream. More specifically, the invention pertains to a method and apparatus for 1) merging a sequential plurality of delta streams with an original data stream to create an updated data stream, 2) merging a sequential plurality of delta streams to create a compiled delta stream, or 3) creating a negative delta stream or streams as one or more delta streams are merged with an original delta stream, or with each other. The method and apparatus may be used in conjunction with a computer backup process, version manager, or the like.

The above-referenced application to Squibb discloses a method and apparatus for producing a change list for an original and updated version of a computer file. The method and apparatus utilize a hash generator CPU to produce a token set for an original file. A comparator CPU later uses the token set and a windowing technique to identify and correlate the locations of coexistent pages in the original and updated files. The comparator CPU then uses the coexistent page information and the residue of the updated file (or original) to create a delta expressing the differences between the original and updated files. The delta is transmitted to another computer and combined with a backup copy of the original file to create a backup copy of the updated file. The original file and a series of deltas are used to retain historical file information in a cost effective manner.

Backup operations requiring the merging of deltas as in Squibb are significantly more streamlined than those requiring the merging of incremental changes. For example, one Gigabyte of mixed file types may have a daily change in 0.5% of its information, but those same changes may be spread through 15% of its files. A daily delta file created using the Squibb method would represent the 0.5% change and have a size of roughly five Megabytes, whereas a daily incremental change file would represent the 15% change in files and have a size of just over 150 Megabytes. Assuming a weekly full backup and daily incremental backups, 78 Gigabytes of information is written in one year, and each incremental backup takes approximately three hours. Using daily delta backups, only two Gigabytes of information is written over the course of a year, and each backup session takes approximately five minutes.

The time and space savings are even more accentuated with regard to a 0.5% change in a one Gigabyte database. In a database, the 0.5% change can be spread throughout 100% of the database, and backup operations using a daily delta file as described in Squibb result in even more significant time, space and cost savings.

Although the above-referenced apparatus and method of Squibb possess unique advantages, one shortcoming is that the one by one merging of deltas with a backup copy of a file requires a significant amount of a backup repository's CPU time, especially when the backup repository is required to merge deltas with several thousand files on a daily basis.

It is therefore a primary object of this invention to provide a method and apparatus which reduce the number of operations carried out by a backup repository's CPU.

Although the application of Squibb discloses that delta files may be saved by the backup repository, it would be advantageous to also create a negative delta for each delta, and save the negative deltas in the backup repository. The storing of negative deltas would allow a backup repository to merge one or more of the negative deltas with its current backup copy, thereby reconstructing a previous version of a file.

It is therefore an additional object of this invention to provide a method and apparatus which allow for the creation of negative deltas, thus enabling the retrieval of earlier file versions.

Since a very large number of delta files can be cumbersome to manage, it would be desirable to periodically reduce the number of delta files (especially old delta files) when they become too numerous. However, merely deleting every Nth delta would destroy the necessary sequential relationships between the deltas.

It is therefore a further object of this invention to provide a method and apparatus which allow the merging of several deltas to create a compiled delta, thereby reducing the management demands placed on a backup repository's CPU.

The delta files (hereinafter referred to as a "delta streams") discussed in the prior U.S. patent application of Squibb comprise information denoting the matching and changed segments between 1) an original data stream (e.g., a computer file) and an updated data stream (e.g., a revised copy of the computer file), or 2) two successive updates of a data stream. Stream refers to the fact that data has a sequentially relationship. Not all delta files (change files) have a sequential relationship.

It is preferable to store sequential files on a sequential media, both for ease of access, and because sequential media is significantly less expensive than non-sequential (seekable) media. An example of a sequential media is the magnetic tape, while examples of seekable media include floppy disks, hard drives, and CD-ROMS.

To date, a method and apparatus for accomplishing the objectives noted above has not been developed.

One existing method of merging delta files is the iterative build method. An iterative build system successively merges a base file with one or more delta files. Delta files cannot be simultaneously merged with a base file. The iterative build method does not reduce the input/output (I/O) operations of the CPU performing the merge. A base file must be read and written once for every delta file with which it is merged. Thus, the number of I/O operations to merge N delta files with a base file is equal to:

$$((N*2)+1)*(\text{number of bytes in the base file})$$

Iterative build systems only work with seekable media, and have therefore not been used for merging delta streams stored on sequential media. If an iterative build system were to be used to merge delta streams stored on a sequential media, the delta streams would first have to be copied on to a seekable media, thereby further increasing the number of I/O operations performed by a CPU. A system of creating negative delta files using an iterative build system is not known.

A variation of the iterative build method is the iterative build pipeline method. A base file is fed into an update process associated with a single delta file. The output of the update process is "piped" to another update process, and so on, until a final updated file is produced. The iterative build pipeline system was made possible by the advent of multi-tasking systems, and only works on a multi-tasking system. An advantage of the system is that I/O is reduced. The number of I/O operations to merge N change files with a base file is equal to:

2*(number of bytes in the base file)

However, several disadvantages remain. First, piping causes a contextual program switch each time a pipe buffer is full. For a large base file being merged with numerous delta files (also possibly large), many contextual switches occur and the performance of the system suffers. Second, the iterative build piping system only works in a multi-tasking environment. Third, the method does not support the creation of negative delta files. Finally, the method once again requires delta files to be stored in a seekable media.

A final method of merging delta files is disclosed in U.S. Pat. No. 5,278,979 to Foster et al. Foster et al discloses a version management system using pointers. Again, files to be merged must be copied to a seekable (non-sequential) media for the pointers to work. The patent discloses an ability to retrieve previous versions by a backwards comparison of versions. This is quite different from creating a reverse path during a forward merge (all in a single pass). Additional disadvantages of the Foster method include 1) poor performance with lengthy base and delta files (the method is directed to "storing multiple versions of program source data" wherein the versions typically involve less than one Megabyte of data), and 2) a contextual limitation of processing changes to "lines" (data must obey contextual rules, and is not treated as a continuous stream).

It is therefore yet another object of this invention to overcome the above disadvantages of other delta merging, backup and version management systems.

SUMMARY OF THE INVENTION

In the achievement of the foregoing objects, the inventors have devised a computer apparatus and method for merging a sequential plurality of delta streams. The method and apparatus may be used to 1) merge a sequential plurality of delta streams with an original data stream to create an updated data stream, 2) merge a sequential plurality of delta streams to create a compiled delta stream, or 3) create a negative delta stream or streams as one or more delta streams are merged with an original delta stream or each other. The method and apparatus may be used in conjunction with a computer backup process, version manager, or the like.

In summary, to merge a sequential plurality of delta streams with an original data stream, a computer constructs a chain of transaction elements corresponding to the sequential plurality of delta streams. The lowest numbered transaction element corresponds to a delta stream representing a first revision to the original data stream, and sequentially numbered transaction elements correspond to sequential revisions of the original data stream. A consumer process initiates a search request, within the transaction chain, for a number of data bytes to transfer to the updated data stream. The search request is initiated with the trailing transaction element (that which represents the last revision to the original data stream). The search request may be 1) fulfilled with data bytes provided by the highest numbered delta stream in the transaction chain capable of supplying data bytes, or 2) if the transaction chain is incapable of fulfilling the search request, it may be fulfilled with data bytes provided by the original data stream. When a search request cannot be fulfilled, the updated data stream is complete.

Optionally, a prior stream position can be monitored for each delta stream. This enables the computer apparatus in transferring a data frame comprised of data from one or more prior streams of a particular delta stream, to a negative delta stream associated with the particular delta stream, when a source match position of the particular delta stream is greater than the prior stream position of the particular delta stream. A source match position is associated with every match frame of a delta stream, and indicates how much of a prior stream should have been consumed by the time a particular match frame is loaded. If enough of a prior stream has not been consumed, it is due to a file deletion occurring between successive delta streams, and the deleted information is recorded in a negative delta stream. After the transfer of a data frame to a negative delta stream, a match frame inversion is created in the negative delta stream.

A variation of the method comprises beginning with an updated data stream and merging it with a sequential plurality of negative delta streams to create a desired prior data stream (possibly the original data stream). Another variation comprises the merging of several delta streams to create a compiled delta stream.

An advantage of the newly developed method and apparatus is an ability to merge delta files (advantageously represented by delta streams) with a file (original data stream) stored in a sequential media, without having to first transfer the files to a seekable media.

Other advantages include 1) an ability to create negative delta streams so that earlier versions of a file may be reconstructed, 2) an ability to merge a number of delta streams and create negative delta streams in a single pass, wherein the number of I/O operations performed by a CPU is limited to:

2*(number of bytes in the base file), 3) an ability to merge multiple delta streams to create a compiled delta stream, thereby reducing the management burdens placed on a CPU, 4) an ability to work efficiently in computer environments which do not support multi-tasking, and 5) an ability to efficiently manage the merging of large data and delta streams.

While the disclosed method and apparatus provide specific advantages for use with sequential storage media, they are also effective for use with seekable media.

It will be appreciated, after a review of the following description, that since delta streams are small with respect to an entire file (roughly 0.5% of the entire file's size), multiple deltas can be kept locally, such as in the hard drive of a PC, in addition to being kept at a central repository. By patching the disclosed apparatus into a file system or an application program, delta streams can be generated in lieu of overwriting files. Thus, a user may retain several version of a document locally, without using extensive disk storage space.

These and other important advantages and objectives of the present invention will be further explained in, or will become apparent from, the accompanying description, drawing and claims.

BRIEF DESCRIPTION OF THE DRAWINGS

An illustrative and presently preferred embodiment of the invention is illustrated in the drawing in which:

FIG. 14 shows the compiled delta stream and three negative delta streams created by the apparatus of FIG. 11 during a merge of the three delta streams of FIG. 9.

DESCRIPTION OF THE PREFERRED EMBODIMENT

Figure 1:
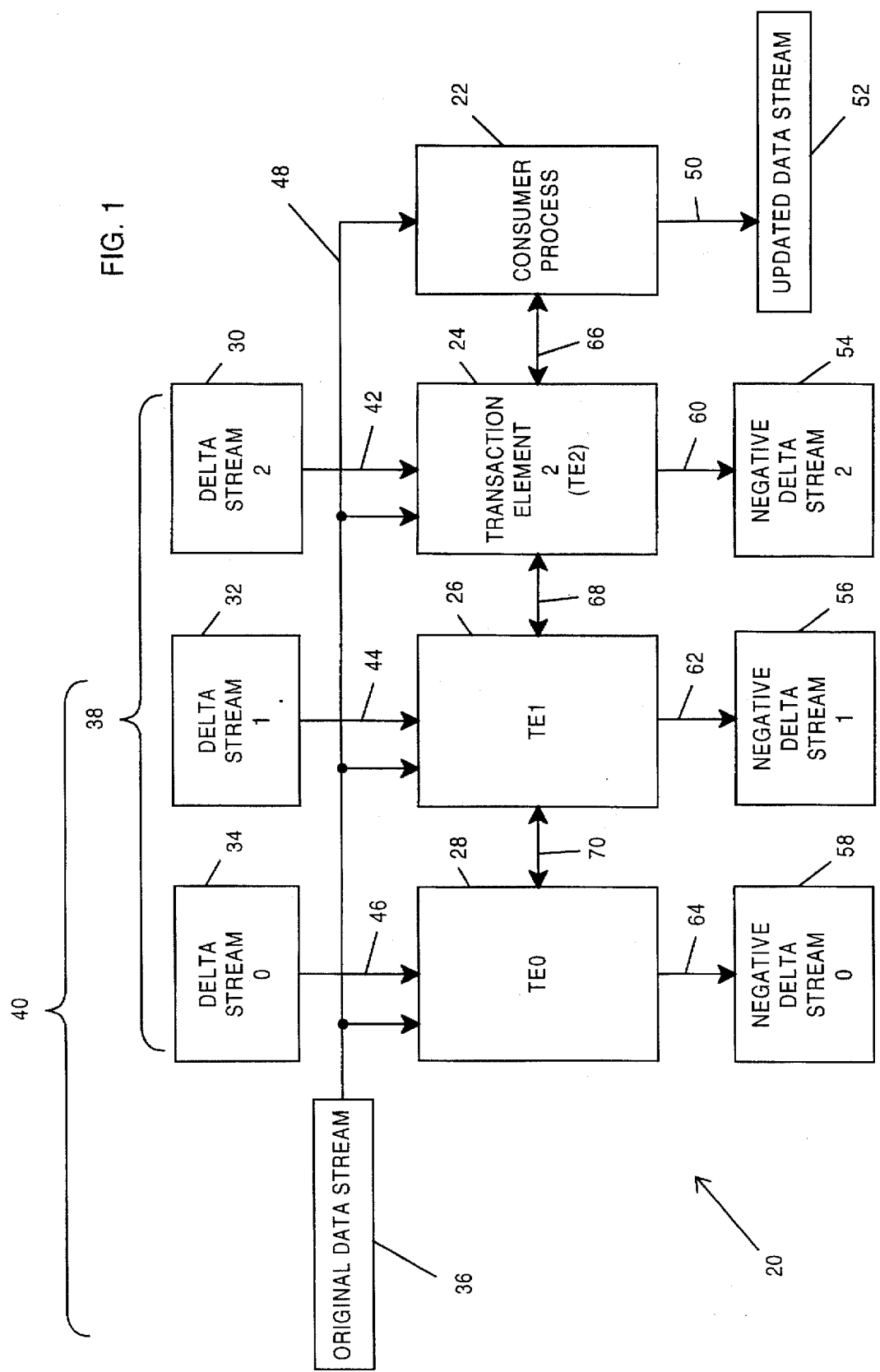
FIG. 1 is a schematic of an apparatus for merging a plurality of sequential delta streams with an original data stream to create a revised data stream.

A schematic of a computer apparatus 20 for merging a sequential plurality of delta streams 30, 32, 34 with an original data stream 36 is shown generally in FIG. 1, which may comprise a transaction chain 38 comprising a plurality of sequenced transaction elements 24, 26, 28, wherein each transaction element 24, 26, 28 has a delta stream input 42, 44, 46 corresponding to one of the sequential plurality of delta streams 30, 32, 34; and a consumer process 22, connected to a trailing element 24 of the transaction chain 38, and comprising an input 48 for the original data stream 36 and an output 50 for the updated data stream 52.

A method for merging a sequential plurality of delta streams 30, 32, 34 with an original data stream 36 is shown generally in the flow charts of FIGS. 2–8, which may comprise the steps of initiating a search request 102, within the sequential plurality of delta streams 30, 32, 34, for a number of data bytes to transfer to the updated data stream 52; fulfilling 110 the search request 102 with data bytes provided by the last delta stream in the sequential plurality of delta streams 30, 32, 34 which is capable of supplying data bytes; if the sequential plurality of delta streams 30, 32, 34 is incapable of fulfilling 110 the search request 102, fulfilling 112 the search request 102 with data bytes provided by the original data stream 36; and repeating the above steps until a search request 102 cannot be fulfilled 110, 112, and the updated data stream 52 is complete 106.

Having thus described the apparatus 20 and method for merging a sequential plurality of delta streams 30, 32, 34 with an original data stream 36 in general, the system will now be described in further detail.

In a preferred embodiment, the transaction elements 24, 26, 28 of the apparatus 20 each further comprise a delta stream reader, a prior transaction element index, a prior stream position monitor, a current frame buffer, and a search request 102 fulfillment I/O interface 66, 68, 70.

The consumer process 22 is responsible for requesting 102 data for the updated data stream 52 from the chain 38 of transaction elements (transaction chain). The prior transaction element index of a transaction element 24, 26, 28 is used in sequentially propagating the search requests 102 of the consumer process 22 through the transaction chain 38. Each search request 102 is first initiated 100 in the trailing element 24 (TE2) of the transaction chain 38, or that which corresponds to a last revision 30 to the original data stream 36. In response to the transaction elements' 24, 26, 28 prior transaction element indices, search requests 102 are propagated through progressively earlier revisions 40 of the original data stream 36, until at last, a search request 102 reaches the transaction element 28 corresponding to a first revision to the original data stream 34 (the 0-element, or TE0).

The delta stream input 42, 44, 46 of a transaction element 24, 26, 28 is regulated so as to sequentially load 160 delta frames (match and/or data frames) from a corresponding delta stream 30, 32, 34 into the transaction element's current frame buffer 170. The steps performed in regulating a particular transaction element's 24, 26, 28 delta stream input 42, 44, 46 are listed in the flow chart of FIG. 4 and will be described in more detail later in this specification.

When a match frame is loaded 168 into a transaction element's 24, 26, 28 current frame buffer 170, the source match position associated with the frame is compared to the prior stream position monitored by the transaction element 24, 26, 28. A prior stream position monitor of a transaction element 24, 26, 28 indicates how many bytes of the transaction element's 24, 26, 28 prior stream 32, 34, 36 have been consumed. The prior stream 32, 34, 36 of a transaction element 24, 26, 28 is identified by the transaction element's 24, 26, 28 prior transaction element index. A source match position is a number included within a match frame which indicates how many bytes of a prior stream 40 should have been consumed by the time a particular match frame is loaded into its transaction element 24, 26, 28. If the source match position is greater than the prior stream position 172, a second search request 196 is initiated so as to advance the stream position of the prior stream 32, 34, 36 by a number of bytes equal to the difference between the source match position and the prior stream position 172 (the prior stream lag count). The steps of this process are outlined in the flow chart of FIG. 5.

The delta stream readers are responsible for reading 130 the delta frames (match and/or data frames) of a delta stream 30, 32, 34 once they have been loaded 120 into a transaction element's 24, 26, 28 current frame buffer. A data frame may be used to fulfill 136 a search request 102 initiated by the consumer process 22 (via the search fulfillment I/O interfaces 66, 68, 70). A match frame causes the search request 102 to be passed 146 to a prior transaction element 26, 28, or when a match frame resides in the current frame buffer of the last transaction element 28 in the transaction chain 38, the match frame causes the consumer process 22 to fulfill 112 its request 102 with data from the original data stream 36. When a search request 102 is passed 146 to a prior transaction element 26, 28, the prior transaction element 26, 28 index of a transaction element 24, 26, 28 is used to determine to which transaction element 26, 28 the search request 102 will be passed 146. The steps carried out by the delta frame reader are outlined in FIG. 3.

Figure 6:
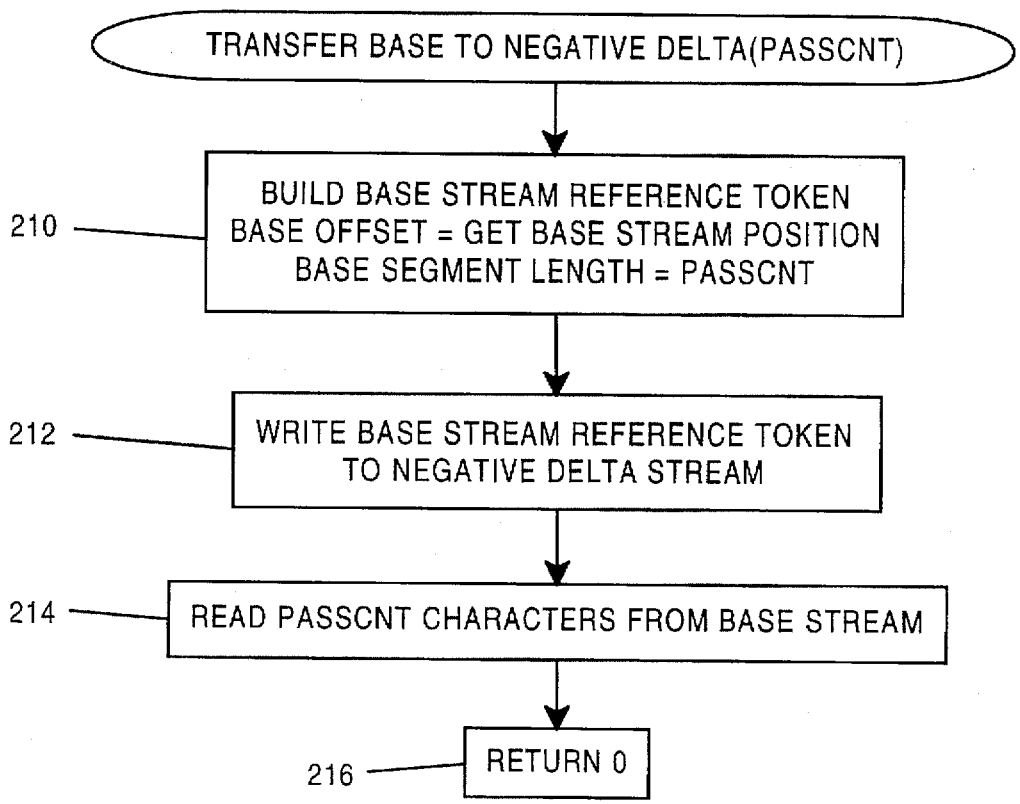
FIG. 6 shows a flow of operations which may be performed by a transaction element of FIG. 1 in transferring data from an original data stream to a negative delta stream.
Figure 7:
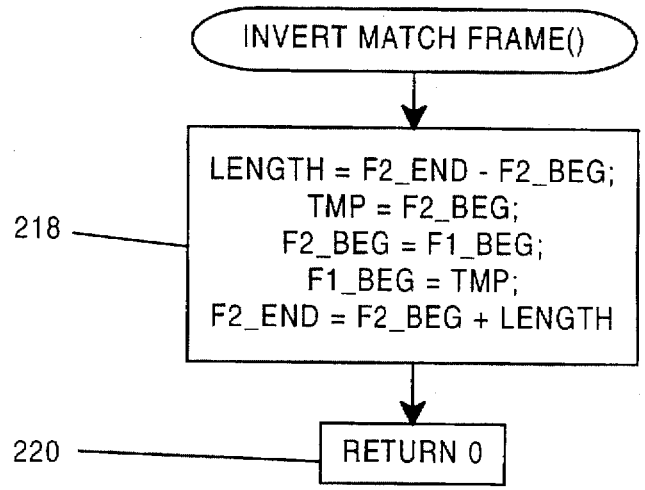
FIG. 7 shows a flow of operations which may be performed by a transaction element of FIG. 1 in creating an inverse match frame for a negative delta stream.

An important addition to the preferred embodiment of the computer apparatus 20 is the inclusion of negative delta stream writers 60, 62, 64 within each of the transaction elements 24, 26, 28. Without the negative delta stream writers 60, 62, 64, the data bytes 172 of a prior stream 32, 34, 36 which are skipped over during the advancing of a prior stream (FIG. 5) are lost. A negative stream writer 60, 62, 64 is called into action by the advancing of a prior stream so that skipped data bytes 172 are written 204 (in the form of a data frame) into a negative delta stream 54, 56, 58 associated with a particular delta stream 30, 32, 34. After writing 204 a data frame to a negative delta stream 54, 56, 58, a match frame inversion of a newly loaded match frame is written 178 to the same negative delta stream 54, 56, 58. In this manner, the negative delta streams 54, 56, 58 provide information for constructing a transaction chain 38 to merge a sequential plurality of negative delta streams 54, 56, 58 with an updated delta stream 52 to retrieve a desired prior data stream 284 (whether it be the original data stream 36 or file, or some intermediate revision of the original data stream). Flow charts for the processes of transferring 204, 178 data frames and match frame inversions to a negative delta stream 54, 56, 58 are shown in FIGS. 6 and 7, respectively.

While the apparatus 20 of FIG. 1 may be embodied in a programmable computer, the apparatus 20 is not limited to such an embodiment. The apparatus 20 may also be embodied in a physical storage media such as a floppy disk, CD-ROM, tape, or the like.

Preferred embodiments of the process steps and routines referred to above will now be described in additional detail.

Consumer Process

The consumer process 22 is responsible for building the updated data stream 52. See FIG. 2. It repeatedly requests 102 data from the transaction chain 38 (chain of transaction elements). All requests 102 are initiated 100 with the trailing element 24 (0-element) of the transaction chain 38. The trailing element 24 is that which reads a delta stream 30 representing a last revision to an original data stream 36, file, database, or the like.

A transaction element 24, 26, 28 can respond 144, 136 to a request 102 of the consumer process 22 in one of two ways. A transaction element 24, 26, 28 can fulfill 110 a request 102 by returning 134 data from a current data frame (data from CURFRAMEBUF 170), or alternatively, by returning 144 a number representing a number of data bytes which need to be transferred 112 from the original data stream 36 to the updated data stream 52. Any data received 108 by the consumer process 22 (through the transaction chain 38) is transferred 110, 112 to the updated data stream 52. The consumer process 22 continues to initiate requests 102 for data until the transaction chain 38 is unable 104 to fulfill a request 102, and the consumer process 22 concludes that the updated data stream has been completed 106.

Figure 2:
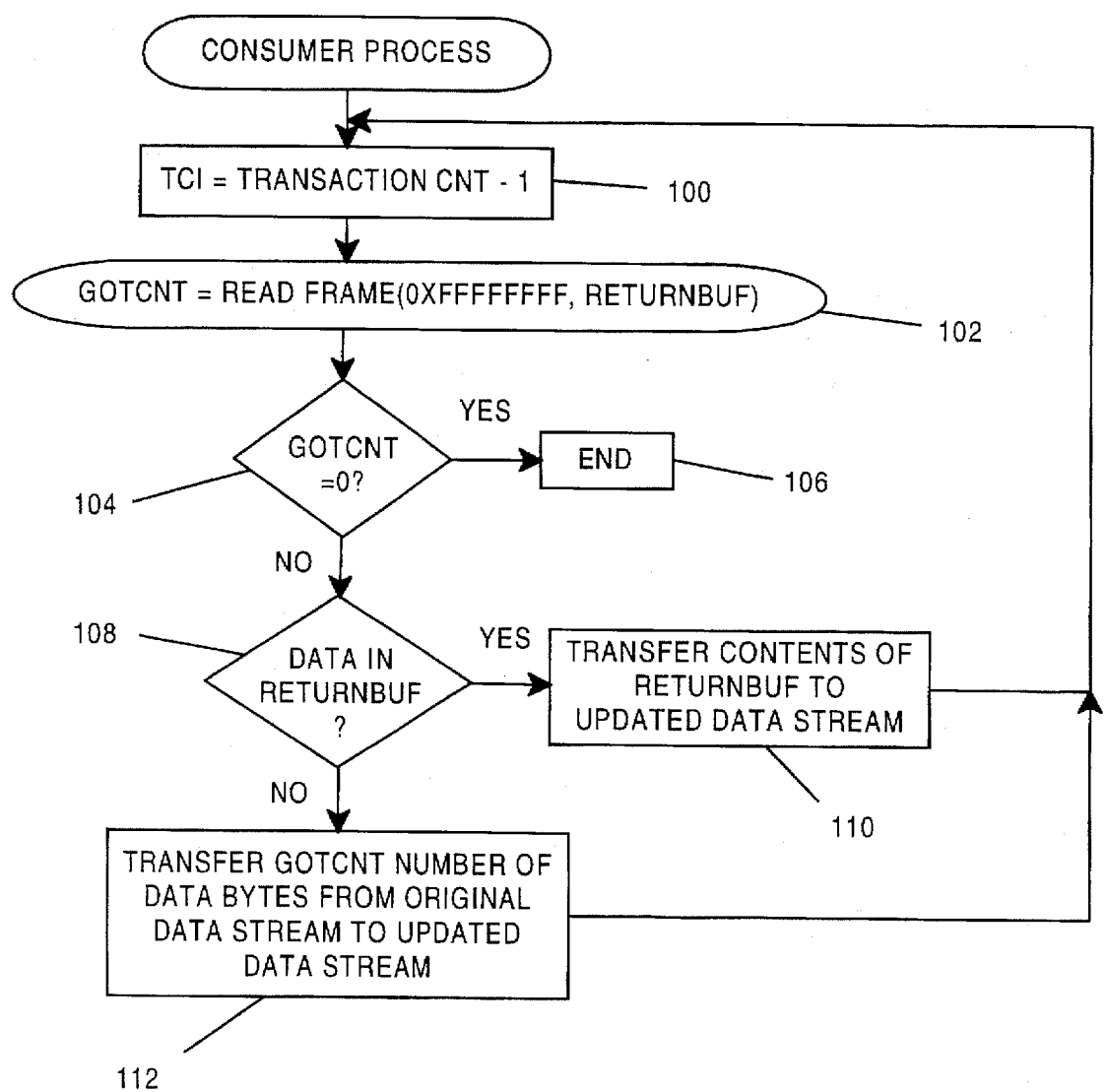
FIG. 2 shows a flow of operations which may be performed by the consumer process of FIG. 1.
Figure 3:
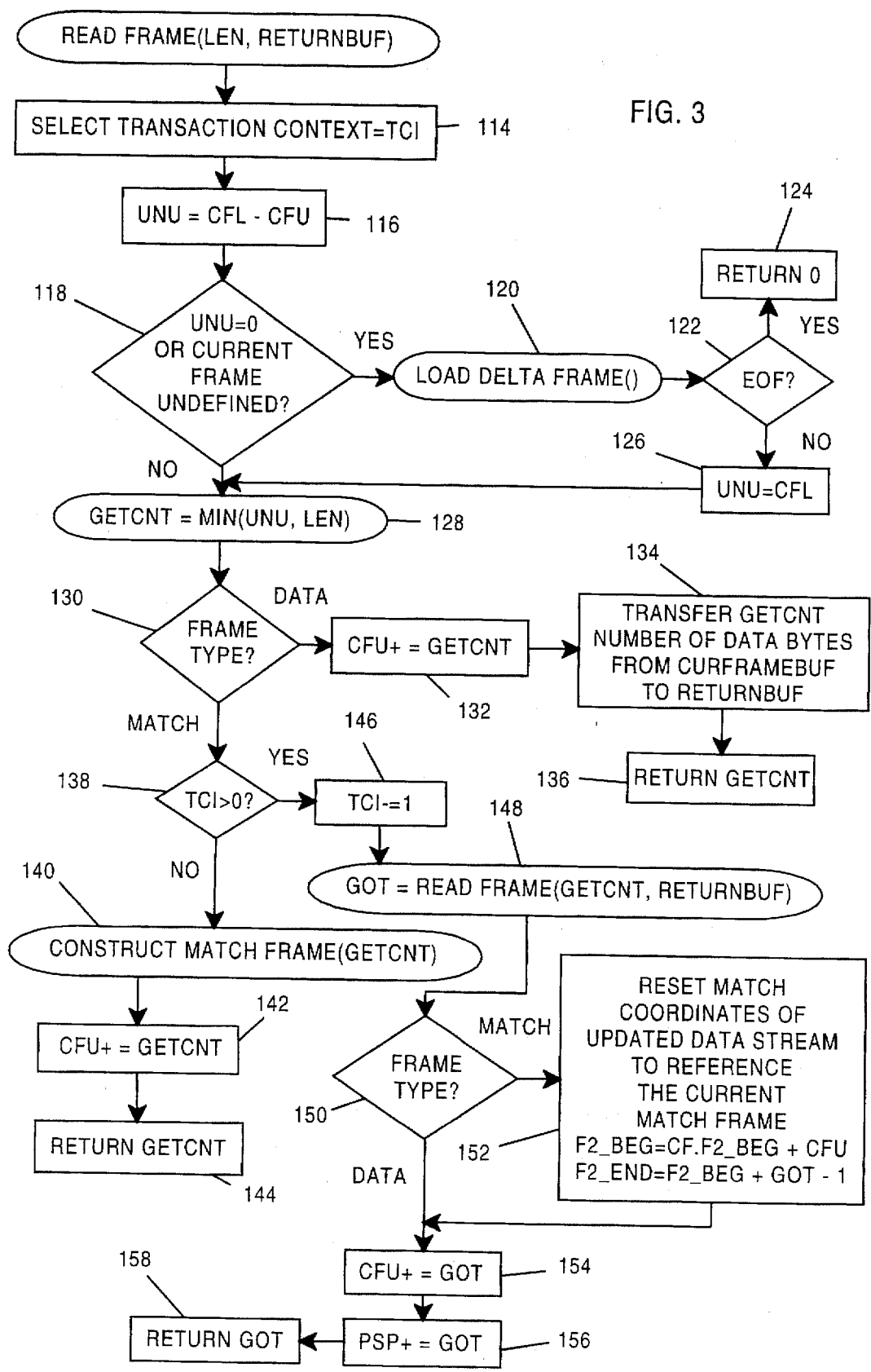
FIG. 3 shows a flow of operations which may be performed by a transaction element of FIG. 1 in reading a delta frame of a corresponding delta stream.
Figure 4:
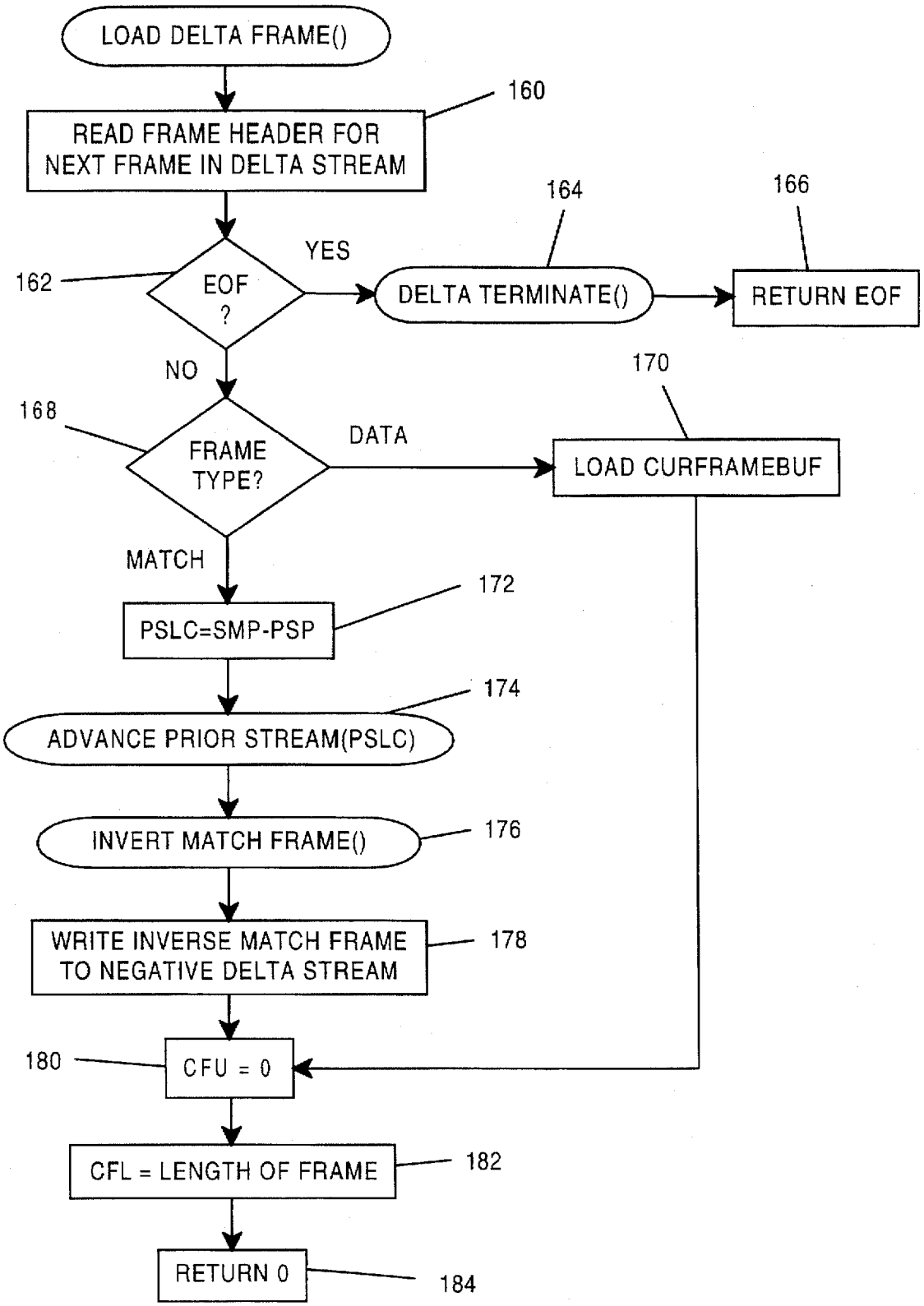
FIG. 4 shows a flow of operations which may be performed by a transaction element of FIG. 1 in loading a delta frame of a corresponding delta stream.

A preferred flow of operations for the CONSUMER PROCESS of FIG. 1 is shown in FIG. 2. The transaction context index (TCI) is used to identify 100 the transaction element 24 to which a request 102 will be made. As far as the consumer process 22 is concerned, the request 102 will always be made to the trailing element 24. Therefore, the consumer process 22 sets 100 the transaction context index to one less than the transaction count (TRANSACTIONCNT), or the total number of transaction elements 24, 26, 28 in the transaction chain 38. Note that the transaction element 24 servicing the delta stream 30 representing the first revision to the original data stream 36 is designated as the 0-element.

GOTCNT represents the greatest number of data bytes which can be transferred 110, 112 to the updated data stream 52 following a single request 102 of the consumer process 22. If data is returned 134 by a transaction element 24, 26, 28, GOTCNT will represent the total number of data bytes returned 136. The data bytes will be returned 134 via a return buffer (RETURNBUF). If the transaction chain 38 cannot supply data from its current frames, but data still remains in the original data stream 36, GOTCNT will represent the number of data bytes to be transferred 112 from the original data stream 36 to the updated data stream 52. When the consumer process 22 initiates a search request 102, GOTCNT is set to 0xFFFFFFFF. Thus, the consumer process 22 is asking the transaction chain 38 for as many bytes as can possibly be returned 136, 144.

Reading a Delta Frame

The frame reading process may be called by any transaction element 24, 26, 28, and in various contexts. For example, bytes may be read from the current frame of a transaction element 24, 26, 28 in response to a search request 102 of the consumer process 22, or a search request 196 of another transaction element 24, 26, 28 which is attempting to advance its prior stream position.

Figure 5:
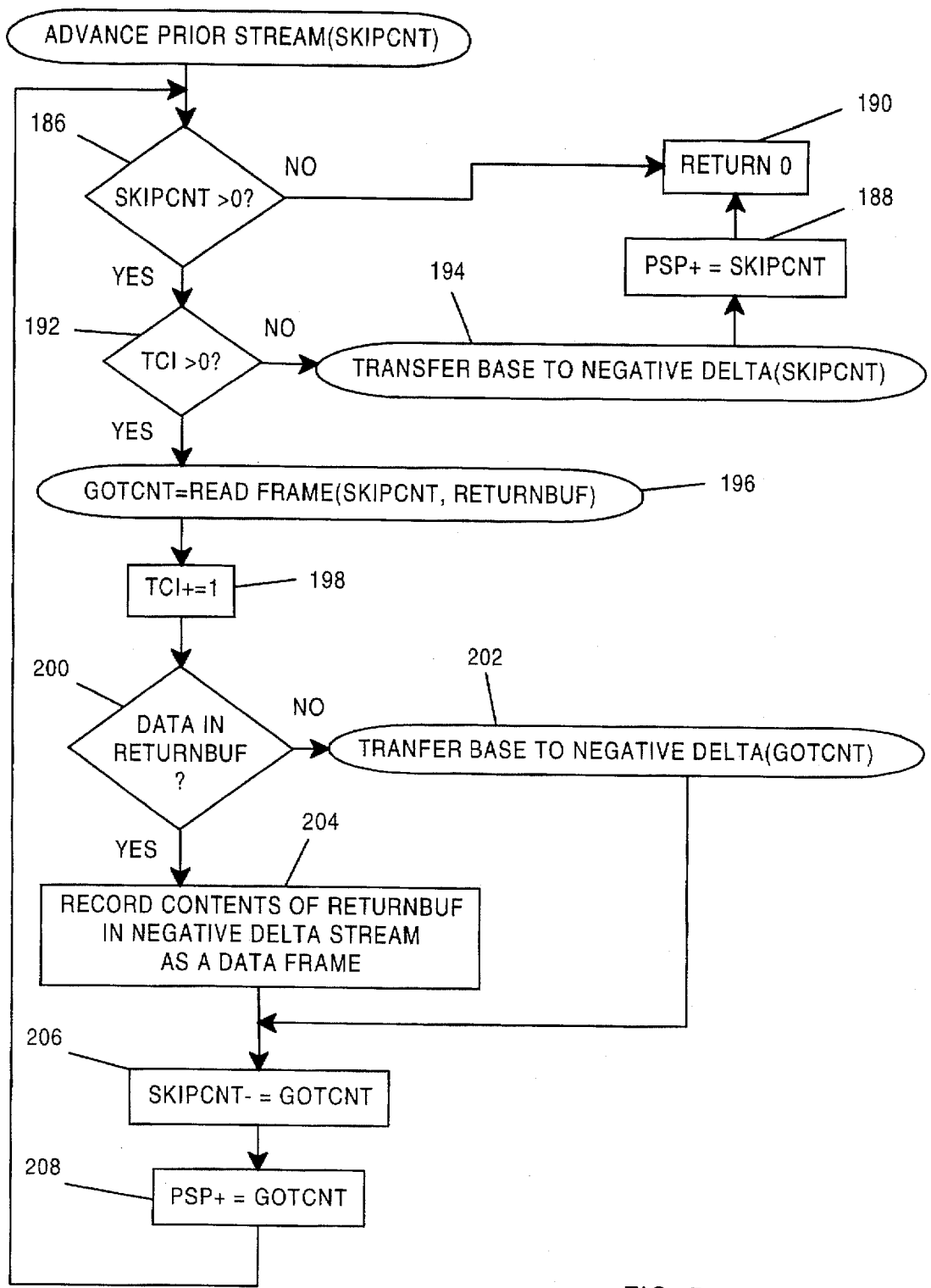
FIG. 5 shows a flow of operations which may be performed by a transaction element of FIG. 1 in advancing the stream position of a prior delta stream.

A preferred flow for the frame reading process, called READ FRAME, is shown in FIG. 5.

When the consumer process 22 initiates a request 102 for the largest number of data bytes the transaction chain 38 can supply, its request 102 is first passed 114 to the trailing element 24 of the transaction chain 38. The trailing element 24 will initiate the delta frame (data and/or match) reading process. See FIG. 3. If all of the bytes 116 represented by a transaction element's 24, 26, 28 current frame have been used 118, a new frame will be loaded 120 into the current frame buffer (CURFRAMEBUF) of the transaction element 24, 26, 28. If the frame loading process returns an end-of-file (EOF) condition 122, a GOTCNT of 0 is returned 124 to the consumer process 22, and the building of a particular updated data stream is complete 106. Otherwise, the loading of a new frame causes the number of unused bytes in a current frame (UNU) to be reset 126 to the newly loaded frame's length (CFL).

Once it is assured that a current frame has been loaded, and that the bytes of a frame have not been depleted 118, GETCNT (a local variable of the Read Frame process used to update the GOTCNT request variable) is set 128 to the minimum of the number of bytes requested 102 in a search, or the number of bytes available 116, 126 in a current frame. If the current frame is a data frame 130, a GETCNT number of data bytes will be copied 134 into RETURNBUF and returned 136 to the consumer process 22. If the current frame is not a data frame 130, the consumer process' 22 request 102 will be passed 146 to a prior transaction element 26, and so on 28, until either 1) data which can be returned 134 to the consumer process 22 is found within a current frame of a transaction element 24, 26, 28, or 2) it is determined 138 that none of the transaction elements 24, 26, 28 can supply data, and a positive GETCNT number is returned 144 to the consumer process 22, indicating that data must be transferred 112 from the original data stream 36 to the updated data stream 52. When the consumer process' 22 request 102 is transferred to a prior transaction element 26, 28, that element 26, 28 executes 148 the same delta frame reading process that was executed by the trailing element 24. However, each time the frame reading process is initiated by a transaction element 24, 26, 28, a unique copy of the local variables associated with the process are stored within a transaction context of a particular transaction element 24, 26, 28. A transaction context's variables include: TCI, CFL, UNU, CFU & PSP.

TCI has already been defined as the transaction context index. CFU represents the number of used bytes (characters) in a current frame. The CFU of every transaction element to which a search request is passed is incremented 132, 154 by the GETCNT or GOT number returned 136, 158.

PSP represents the prior stream position associated with a transaction element 24, 26, 28, and is an important variable in advancing a prior stream's position (this task will be described in greater detail in a later section). However, note that the PSP of every transaction element 24, 26, 28 to which a search request is passed, but for the PSP of a transaction element 24, 26, 28 fulfilling 136 a search request 102, is advanced 156 by the number of bytes (GETCNT or GOT) returned to the consumer process 22 or other requesting entity 24, 26, 28.

Other variables referred to 152 in the READ FRAME flow are: F2_BEG, F2_END and CF•F2_BEG. F2_BEG and F2_END represent the beginning and ending addresses of the updated data stream referenced by a current match frame, and CF•F2_BEG represents the next address to be filled in the updated data stream 52. These variables have additional significance when creating 176 a match frame inversion to write 178 to a negative delta stream 54, 56, 58, or when constructing 140 a match frame to write to a compiled delta stream 294.

Loading a Delta Frame

When the number of unused bytes (UNU) in a transaction element's 24, 26, 28 current delta frame is determined 118 to be zero, a new frame must be loaded 120 as the transaction element's 24, 26, 28 current frame. The process of loading a new delta frame is revealed in the flow chart of FIG. 4.

Although not discussed elsewhere in this application, each delta frame in a delta stream's 30, 32, 34 delta frame sequence is preceded by a frame header (or alternatively, the header information may be included within the frame). The frame header is read 160 to determine whether a match frame, data frame or EOF frame has been encountered. If an EOF frame is loaded 162, signifying 166 to the consumer process 22 that an updated data stream 52 is complete 106, a DELTA TERMINATE process 164 insures that each and every transaction element 24, 26, 28 continues to read its delta stream 30, 32, 34 until an EOF frame is reached 162. In this manner, negative delta streams 54, 56, 58 are not left in an unfinished state.

If a newly loaded frame is a data frame 168, a transaction element's 24, 26, 28 current frame buffer (CURFRAMEBUF) is loaded 170 with the frame's data bytes.

If a match frame is loaded 168, a source match position (SMP) associated with the match frame is compared 172 to the loading transaction element's 24, 26, 28 PSP. The source match position indicates how many bytes should have already been consumed from a stream 32, 34, 36 associated with an immediately prior transaction element 26, 28 by the time the frame associated with the particular SMP is loaded. Therefore, if a match frame's SMP exceeds its transaction element's PSP, a number of bytes representing the difference 172 (PSLC, or prior stream lag count) will need to be consumed 174 from the prior stream 32, 34, 36 before proceeding with the current search request 102 of the consumer process 22.

After a prior stream has been advanced 174, and a number of data bytes representing the PSLC (data deleted between consecutive revisions of the original data stream) have been transferred 204, 194, 202 to a particular negative delta stream 54, 56, 58, a routine is called 176 which inverts the newly loaded match frame and causes the match frame inversion to be written 178 into a particular transaction element's 24, 26, 28 negative delta stream 54, 56, 58. A match frame inversion is a frame which indicates a reverse match condition (i.e., which data bytes in an updated data stream 52 match the bytes of a prior data stream 284).

Regardless of whether a data or match frame is loaded 120 as the new current frame of a transaction element 24, 26, 28, the number of used bytes in the current frame (CFU) is reset 180 to zero, and the current frame's length (CFL) is set 182 to represent the number of bytes referenced by the new frame.

Advancing the Number of Bytes Consumed by a Prior Stream

Whenever the loading 120 of a match frame creates 172 a positive PSLC, the number of bytes consumed from a prior transaction element's 26, 28 delta stream 32, 34 must be advanced by the PSLC. The ADVANCE PRIOR STREAM flow of FIG. 5 shows the steps involved in advancing a transaction element's 26, 28 prior stream 32, 34, while the steps involved in advancing 194, 202 the number of bytes consumed by the original data stream 36 are shown in the TRANSFER BASE TO NEGATIVE DELTA flow chart (FIG. 6).

If a positive PSLC remains 186, and a prior transaction element 26, 28 exists 192, a second search request 196 is initiated while the search request 102 of the consumer process 22 is held in abeyance. The number of data bytes requested 196 in the second search request is defined by the SKIPCNT variable, which is initially equal to PSLC. The second search request 196 necessitates the running of additional instances of the FIG. 3 frame reading process. Note that the frame reading process may call itself 148, as part of the second search request 196, in an attempt to fulfill 136, 144 a request 196 for a SKIPCNT number of data bytes. Data is returned 200 to the ADVANCE PRIOR STREAM flow via the RETURNBUF. If data is returned 200, it is written 204 to a particular negative delta stream 54, 56, 58 in the form of a data frame. If a positive GOTCNT number is returned, but RETURNBUF is empty, the TRANSFER BASE TO NEGATIVE DELTA routine 202 is used to transfer 212 data from the original data stream 36 to the particular negative delta stream 54, 56, 58. If a second search request 196 is only partially fulfilled 204 by a GOTCNT number of data bytes, SKIPCNT is reduced 206 by the GOTCNT number, and the steps of the prior stream advancement flow are repeated.

The prior stream position of every transaction element 24, 26, 28 having a position number in the transaction chain 38 which is less than or equal to the number of the transaction element 24, 26, 28 initiating a second search request 196, but greater than the number of the transaction element 24, 26, 28 (or stream 36) fulfilling the request 196, is increased 188, 208 by the number of bytes transferred 204, 194, 202 to a particular negative delta stream 54, 56, 58.

Closely related to the ADVANCE PRIOR STREAM routine is the TRANSFER BASE TO NEGATIVE DELTA routine. As early stated, the second routine is called when the elements 24, 26, 28 of a transaction chain 38 prior 40 to a particular element 24, 26, 28 are unable to fulfill a request 174, 196 for a PSLC (SKIPCNT) number of data bytes. The TRANSFER BASE TO NEGATIVE DELTA routine may seem like overkill with respect to merging a sequential plurality of delta streams 30, 32, 34 with an original data stream 36. However, when merging a sequential plurality of delta streams 30, 32, 34 to create a compiled delta stream 294, the original data stream 36 may not be available. It is therefore necessary to include a token 210, 212 in a negative delta stream 288, 290, 292 which references the missing original data stream 36. If the original data stream 36 is present, data bytes from the original data stream 36 may be used to fill 214 the Base (original) Stream Reference Token. PASSCNT is the local variable of the TRANSFER BASE TO NEGATIVE DELTA flow which initially equals either the PSLC or SKIPCNT variable of its calling routine.

Creating a Match Frame Inversion

FIG. 7 shows the steps involved in creating an inverse match frame or match frame inversion. The steps involve a simple algorithmic inversion 218, whereby a frame indicating a segment in a delta stream 30, 32, 34 which matches a segment in a prior delta stream 32, 34, 36 representing a prior revision to an original data stream 36 is "inverted" so that the inverse match frame recorded 178 in a negative delta stream 54, 56, 58 indicates a segment in a negative delta stream 54, 56, 58 which matches a segment in a negative delta stream 54, 56, 58 representing a prior revision to an updated data stream 52.

Figure 8:
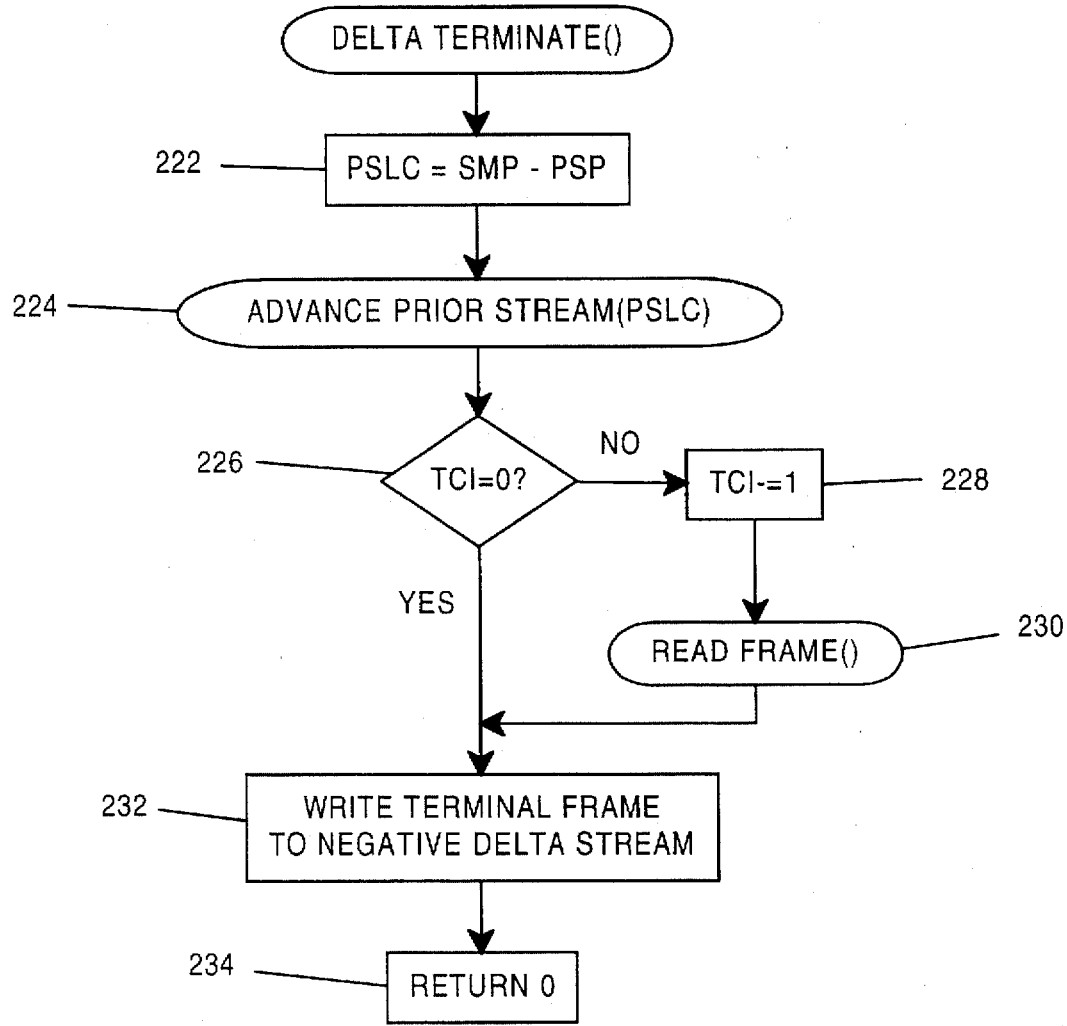
FIG. 8 shows a flow of operations which may be performed by a transaction element which has loaded the final frame of its corresponding delta stream.

Insuring that Each Transaction Element has Read All of the Frames in Its Corresponding Delta Stream By the time an end-of-file (EOF) frame has been reached 162 by a transaction element 24, 26, 28, the updated data stream 52 has been completed 106. However, the final frames of one or more delta streams 30, 32, 34 may not have been read. In order to insure that all negative delta streams 54, 56, 58 are complete, a DELTA TERMINATE process is initiated (FIG. 8).

An EOF frame will include a SMP referencing the last byte in the prior transaction element's 56, 58 delta stream 32, 34. A prior stream lag count (PSLC) is calculated 222 as the difference between the EOF frame's SMP and the PSP of the transaction element 24, 26, 28 loading the EOF frame. Prior streams 40 are advanced 224 by calling the ADVANCE PRIOR STREAM routine of FIG. 5 using the PSLC as the number of data bytes left to read in a prior stream 32, 34, 36. As EOF frame's are encountered 228 in prior streams 40, additional instances of the DELTA TERMINATE routine will be run, thus causing a ripple effect which insures 232 that all frames of all delta streams have been read.

Figure 9:
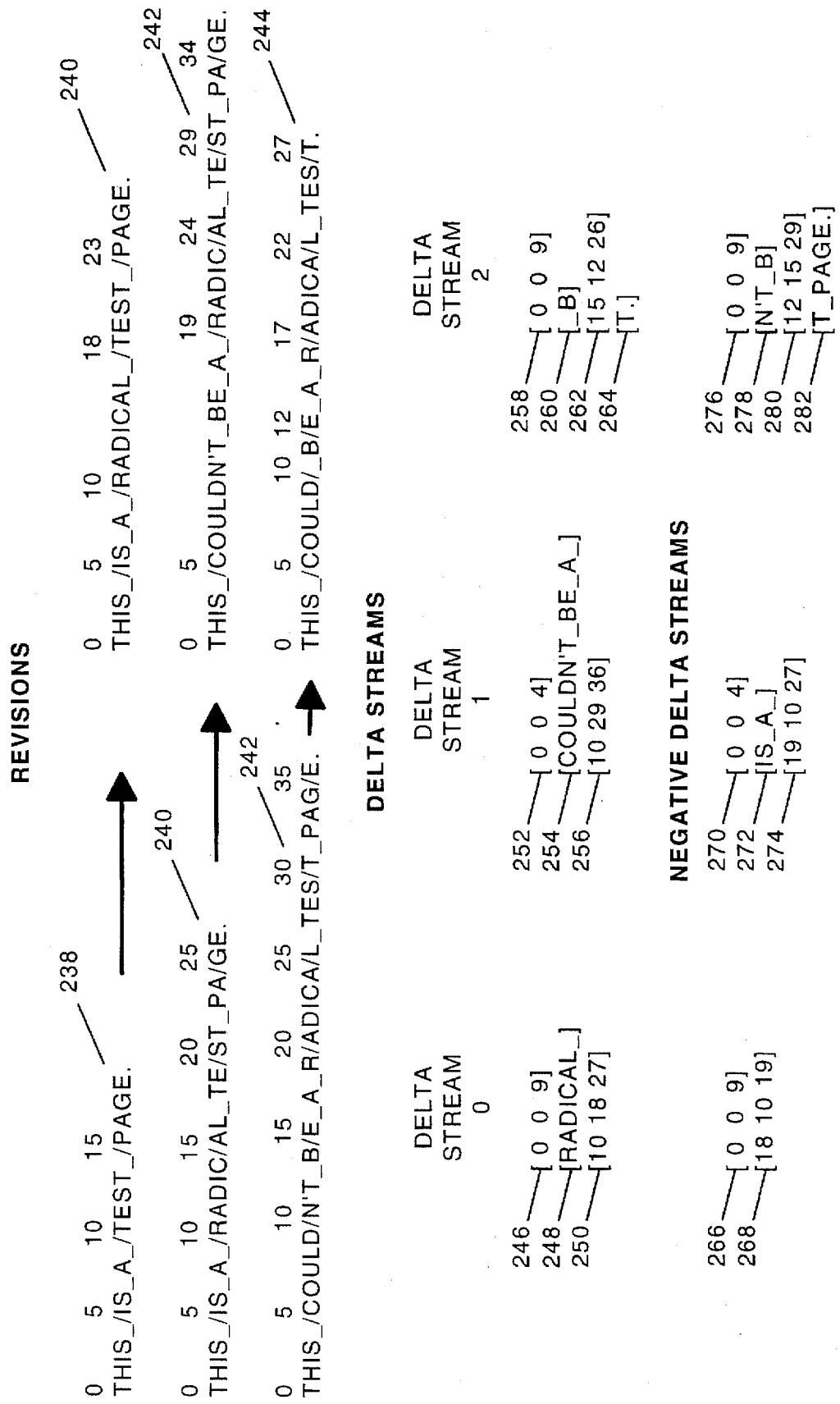
FIG. 9 shows three revisions to a simple sentence, three delta streams representing the revisions, and three negative delta streams which could have been generated by the apparatus of FIG. 1.

Additional understanding of the method and apparatus 20 for merging a sequential plurality of delta streams 24, 26, 28 with an original data stream 36 may be derived from the example of FIG. 9. The figure shows three revisions 240, 242, 244 to the simple text file 238, "THIS_IS_A_TEST_PAGE." Following the three revisions 240, 242, 244 are three delta streams created by application of the method described in U.S. patent application Ser. No. 08/039,702 of Squibb. The data frames comprise added data (an adjustment). The match frames comprise a source match position (early file index), followed by the beginning (updated file offset) and ending bytes of a segment in the revised file which matches a segment in the prior file.

Using the three delta streams, the original text file 238, and the apparatus 20 and method described above for merging them, the final revised text file 244 of FIG. 9 may be constructed.

The merge begins as a transaction chain 38 is constructed, and all global and transaction context variables are initialized. The three revisions 240, 242, 244 of FIG. 9, represented by delta streams 0, 1 and 2, correspond with transaction elements 0, 1 and 2 of FIG. 1.

The consumer process 22 requests 102 as many data bytes as the transaction chain 38 can supply, and initiates its search 102 in the trailing transaction element 24 (TE2). Since the current frame of TE2 is undefined, the first frame 258 of the corresponding delta stream 30 is loaded 120 as the current frame of TE2. In loading the frame 258, an inversion of the match frame is recorded 178 in the negative delta stream 54 of TE2. Prior stream advancement does not occur since the source match position (SMP) of the loaded match frame 258 is zero. The match frame 258 comprises ten bytes, thus causing a search request 102 for ten data bytes to be passed 146 to TE1. TE1 loads 120 its first frame 252, and records 178 an inversion of its match frame in its corresponding negative delta stream 56. Once again, the SMP of the new frame is zero, and prior stream advancement does not occur. The newly loaded frame 252 of TE1 is a match frame of five bytes, so the search request 102 is modified 128 again (to five data bytes) before being passed 146 to TE0. Finally, TE0 loads 120 its first delta frame 246, a match frame 246 of ten bytes. An inverse of the match frame is recorded 178 in TE0's negative delta stream 58, but prior stream advancement does not occur. Since TE0's current frame length of ten bytes is greater than the requested number of data bytes, TE0 does not modify the search request 102. However, since it has no data to supply, it returns 144 the modified search request 102 for five data bytes to the consumer process 22 by propagating the number five back through the transaction chain 38. As the number five is passed back 144, 158 to each transaction element 26, 24, the prior stream position (PSP) of each transaction element 26, 24 is incremented 156 by five. Upon receiving its unfulfilled search request 102, the consumer process 22 transfers 112 the first five data bytes of the original text file 238 (THIS_) to the updated text file 52.

Another search request 102 is now initiated by the consumer process 22. Since the current frame of TE2 is a match frame 258 with five unused bytes, the search request 102 is modified 128 and passed 146 along. TE1, having depleted the five bytes of its current match frame 252, loads 120 the second delta frame 254 of its delta stream 32. The second frame 254 is a data frame, and the search request 102 is fulfilled 134, 136 with five data bytes (COULD). As the data is returned through the transaction chain 38, the PSP of TE2 rises from five to ten.

During the third request 102 of the consumer process 22, TE2 must load 120 a new delta frame. Since the new frame 260 is a data frame, its entire contents (_B) are returned 134 to the consumer process 22. The updated text file 52 now reads, "THIS_COULD_B".

A next request 102 of the consumer process 22 causes TE2 to load the third frame 262 of its delta stream 30. Since the frame 262 is a match frame, the SMP of the frame 262 is compared to TE2's PSP and it is determined 172 that the stream 32 prior to TE2 needs to be advanced by five bytes (15−10=5). A second search request 196, for five bytes, is initiated in the streams 40 prior to TE2. Since the current data frame 254 of TE1 can supply the entire five bytes requested in the second search 196, and fulfill the necessary advancement of TE2's PSP, the second search request 196 is terminated 190. The five bytes returned by TE1 (NT_B) are written 204 into the negative delta stream 54 of TE2. Having advanced its PSP to fifteen, TE2 records 178 the inverse of its newly loaded match frame 262 in its negative delta stream 54, reduces the consumer process' requested number of bytes to fifteen (the length of its current match frame), and passes 146 the request 102 to TE1. TE1 can supply four data bytes (E_A_) from its current data frame 254. As the data is returned 136 to the consumer process 22, TE2's PSP is incremented 156 to nineteen.

The next request 102 of the consumer process 22 is passed 146 through TE2, being reduced 128 to eleven. TE1 must now load 120 a new delta frame. Since its next available frame is a match frame 256, it determines that the SMP of the new frame 256 is greater than its PSP (10−5=5), and the prior stream must be advanced 174 by five bytes. Since TE0 has five bytes left in its match frame 246, the next five bytes of the original text file 238 (IS_A_) must be transferred 194 to the negative delta stream 56 of TE1. In returning the data through the transaction chain 38, the PSP of TE0 is incremented 156 to ten, and the PSP of TE1 is also incremented 156 to ten. An inverse of TE1's new match frame 256 is recorded 178 in its negative delta stream 56. Since the newly loaded match frame 256 of TE1 is longer than eleven bytes, the consumer process' 22 search request 102 is passed 146, unmodified, to TE0. TE0 is required to load 120 the next frame 248 of its delta stream 34. The frame 248 is a data frame of eight bytes, so the search request 102 is modified 128, and eight data bytes (RADICAL_) are returned 136 through the transaction chain 38. The PSP of TE1 is incremented 156 to eighteen, and the PSP of TE2 is incremented 156 to twenty-seven. The updated text file 52 being created by the consumer process 22 now reads, "THIS_COULD_BE_A_RADICAL_".

An additional request 102 of the consumer process 22 is reduced 128 to a request 102 for three data bytes as it is passed 146 through TE2. The request 102 for three data bytes is passed 146 through TE1 without modification. Upon reaching TE0, the search request 102 is held in abeyance as TE0 loads 120 the last frame 250 of its delta stream 34. Since the SMP of the loaded match frame 250 equals TE0's PSP (10=10), prior stream advancement does not occur. However, an inverse of the match frame is recorded 178 in TE0's negative delta stream 58. The request 102 for three data bytes is returned 144 to the consumer process 22 unfulfilled. As it is returned, TE1's PSP rises to twenty-one, and TE2's PSP rises to thirty. The next three bytes (TES) of the original text file 238 are transferred 112 to the updated text file 52.

The next request 102 of the consumer process 22 is fulfilled 134, 136 by the two bytes (T.) of a newly loaded data frame 264 of TE2.

A final request 102 of the consumer process 22 is returned unfulfilled, having been reduced to zero when TE2 acknowledged reaching the end 122 of its data stream 30. The consumer process 22 has therefore completed its building of the updated text file 244, "THIS_COULD_BE_A_RADICAL_TEST."

When TE2 acknowledges 166 reaching the end of its delta stream 30, a ripple effect is set into action which causes the other transaction elements 26, 28 to wind up 224 the reading of their own delta streams 32, 34 and complete 232 the building of their negative delta streams 56, 58. In this process, the last seven characters of the original text file 238 (T_PAGE.) are written to the negative delta stream 54 of TE2 as a data frame.

It should be understood that while the above example initiated a merging of three delta streams 30, 32, 34 with an original data stream 36, the above method and apparatus 20 will readily merge from one to many delta streams with an original data stream 36. The number of streams to be merged is only limited by the capabilities of a given CPU.

Figure 10:
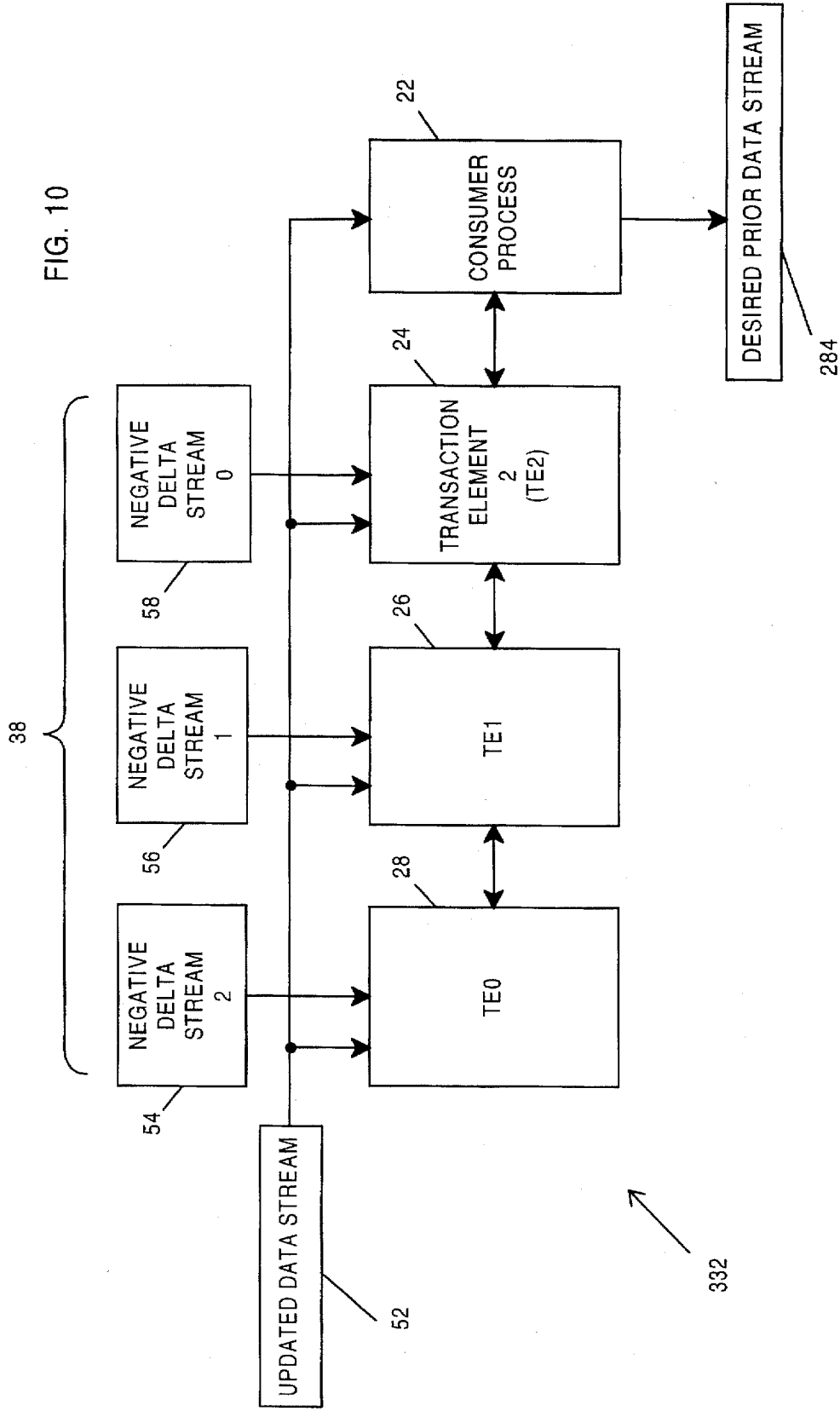
FIG. 10 is a schematic of an apparatus for merging a sequential plurality of negative delta streams with an updated data stream to reconstruct a desired prior data stream.

If it was desired to reverse the above merge process, and reconstruct the original text file 238 of FIG. 9, having only the updated text file 244 and the three negative delta streams 54, 56, 58, the computer apparatus 20 could construct the transaction chain 38 of FIG. 10. Note that the negative delta streams 54, 56, 58 are linked to the transaction elements 24, 26, 28 in a reverse order, and that negatives of the negative delta streams 54, 56, 58 are not created (in reality, the negative delta stream writers are linked to null devices). Stepping through the method of FIGS. 2–8, the original text file 238 could be reconstructed. Likewise, a transaction chain comprising only negative delta streams 2 and 1 could be used to reconstruct the first revision 240 (a desired prior data stream 284) to the original text file 238.

The method and apparatus 20 described above, with some minor modifications, can also be used to merge a sequential plurality of delta streams 30, 32, 34 to create a compiled delta stream 294. Rather than transferring data bytes to an updated data stream 52, delta frames (data and/or match) are transferred 306, 308 to a compiled delta stream 294.

The modifications which need to be made to the apparatus 20 of FIG. 1 include the substitution of a compiler consumer process 286 and compiled delta stream 294 connection for the consumer process 22 and updated data stream 52 connection. These modifications are shown in the apparatus 334 of FIG. 11. Additionally, the original data stream 48 connections are removed. The only change in the method is a change in the flow of operations within the compiler consumer process 286, as outlined below.

Compiler Consumer Process

The compiler consumer process 286 is responsible for building the compiled delta stream 294, and is similar in most respects to the consumer process 22 which builds an updated data stream 52. Again, it repeatedly requests 298 data from the transaction element chain 38, and all requests 298 are initiated 296 to the trailing element 24 of the chain 38. The transaction elements 24, 26, 28 respond to the compiler consumer process 286 in the same manner that they would respond to a request 102 from a standard consumer process 22. However, some slight differences exist. If data is returned 304 by a transaction element 24, 26, 28, it is copied 306 into the compiled delta stream 294 as a data frame. The data bytes of the data frame are not extracted. This is due to the fact that a "delta stream" 294 rather than a "data stream" 52 is being compiled. If the transaction chain 38 returns a positive GOTCNT number, data is not transferred from the original data stream 36, since a connection to that stream may not exist. Instead of transferring data from the original data stream 36, a match frame which references the original data stream 36 is written 308 in the compiled delta stream 294.

The compiler consumer process 286 continues to initiate requests 298 until the transaction elements 24, 26, 28 reach the end of their delta streams 30, 32, 34 and are unable 302 to fulfill 306 a request 298 or return 308 a positive GOTCNT number.

Figure 11:
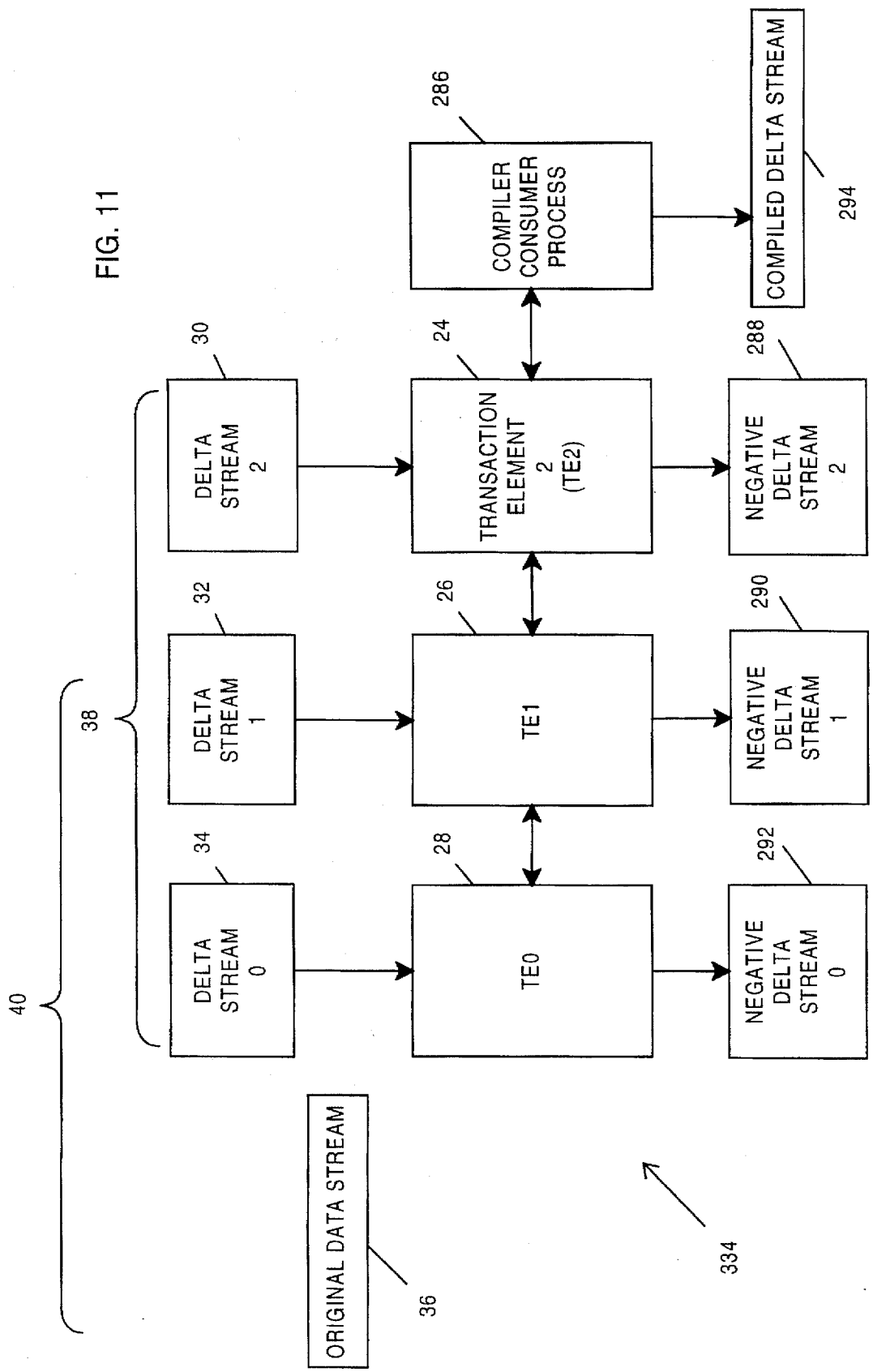
FIG. 11 is a schematic of an apparatus for merging a sequential plurality of delta streams to create a compiled delta stream.
Figure 12:
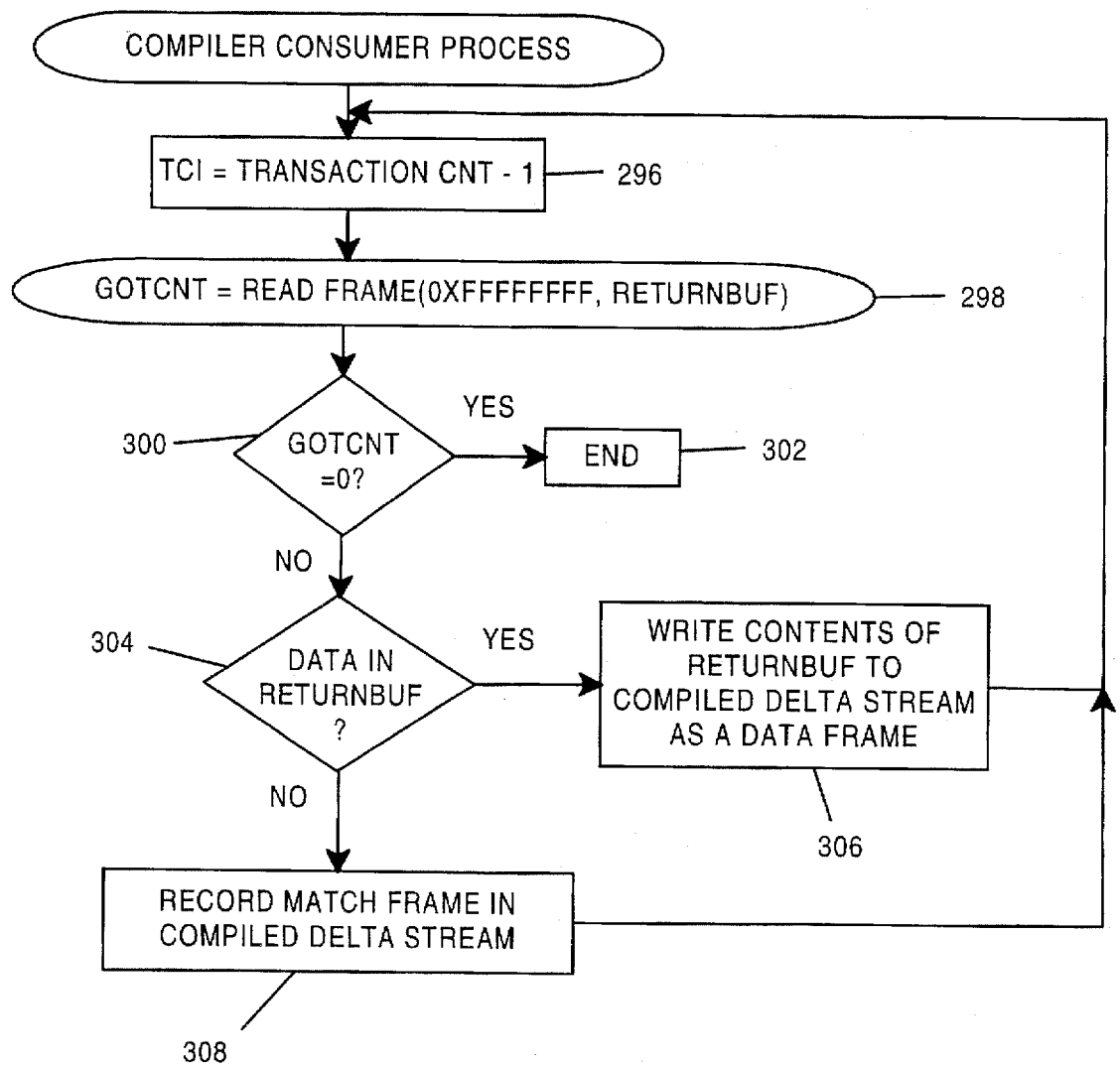
FIG. 12 shows a flow of operations which may be performed by the compiler consumer process of FIG. 11.

A preferred flow of operations for the compiler consumer process 286 of FIG. 11 is shown in FIG. 12. The variables in the flow chart of FIG. 12 are identical to those of FIG. 2 for the standard consumer process 22.

The frame reading process (FIG. 3) called by the compiler consumer process 286 is identical to the frame reading process previously described. However, the result 312 of the Construct Match Frame process, which was previously ignored, is now used when writing 308 a match frame to the compiled delta stream 294. As previously stated, in a compiled delta stream 294, a match frame is constructed 140 in lieu of transferring data from an original data stream 36 to the compiled delta stream 294. The process of constructing 310 a match frame in a compiled delta stream 294 is described below.

Constructing a Match Frame in a Compiled Delta Stream

If a search request 298 of the compiler consumer process 286 is passed through the transaction chain 38, and none of the transaction elements 24, 26, 28 is capable of returning data to the compiler consumer process 286, a match frame must be constructed 310 so that the compiled delta stream 294 will be able to instruct a consumer process 22 when to draw data from an original data stream 36.

Figure 13:
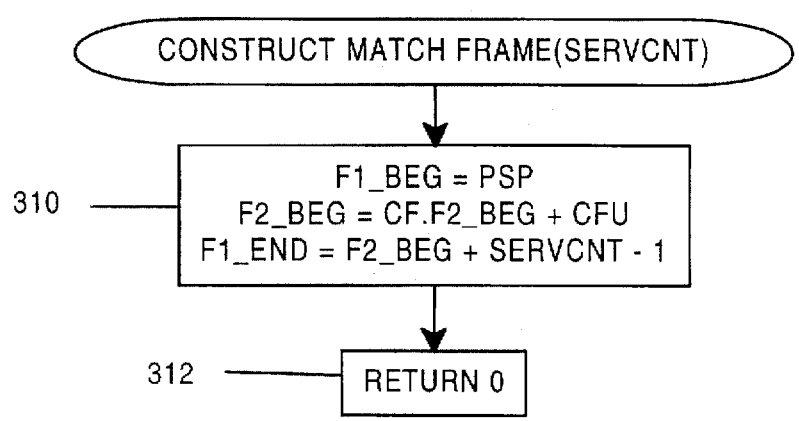
FIG. 13 shows a flow of operations which may be performed by a transaction element of FIG. 11 in constructing a match frame in the compiled delta stream.

A flow of operations for the match frame construction process is shown in FIG. 13. The match frame construction process will always be called by TE0, the transaction element 28 at the end of the transaction chain 38, as shown in the Read Frame flow of FIG. 3. The Construct Match Frame routine utilizes a combination of the transaction context variables of the transaction element 28 calling it, and also, the transaction context variables of the trailing element 24 (TE2 in FIG. 11). Definitions for FIG. 13 variables which are not defined elsewhere in this specification, are as follows:

SERVCNT: the number of characters to be represented by the constructed match frame CF•F2_BEG: the beginning address of the current delta frame for the trailing transaction element 28 (TE2 in FIG. 11)

Further understanding of the method and apparatus 334 for merging a sequential plurality of delta streams 30, 32, 34 to create a compiled delta stream 294 may be derived from the example of FIG. 14. The example is based on the three revisions 240, 242, 244 to the simple text file 238 of FIG. 9. The three delta streams 30, 32, 34 created by application of the method described in U.S. patent application Ser. No. 08/039,702 of Squibb are repeated in FIG. 14. Using the three delta streams 30, 32, 34, and the apparatus 334 and method described above for merging them, the compiled delta stream 294 of FIG. 14 may be constructed.

Once again, the merge begins with the construction of a transaction chain 38, and initialization of all global and contextual variables. Delta streams 0, 1 and 2, correspond with the transaction elements 0, 1 and 2 of FIG. 11.

The compiler consumer process 286 requests 298 as many data bytes as the transaction chain 38 can supply, and initiates 296 its search 298 in trailing transaction element TE2. As in the merge of delta streams 30, 32, 34 with an original data stream 36, the first request 298 of the compiler consumer process 286 causes each transaction element 24, 26, 28 in the chain 38 to load its first delta frame 246, 252, 258 and write 178 a match frame inversion 266, 270, 276 in its corresponding negative delta stream 288, 290, 292. When the search request 298 (having been modified 128 to a request 298 for five data bytes) reaches TE0 and cannot be fulfilled, a match frame 318 referencing the original data stream 36 is constructed 140, and the modified search request 298 for five data bytes is propagated back through the transaction chain 38 to the compiler consumer process 286. As the number five is passed back to each transaction element 24, 26, 28, the prior stream position (PSP) of each transaction element 24, 26, 28 is incremented 156 by five. Upon receiving its unfulfilled 304 search request 298, the compiler consumer process 286 records 308 the constructed match frame 318 in the compiled delta stream 294.

Another search request 298 is now initiated by the compiler consumer process 286. Since the current frame of TE2 is a current match frame 258 with five unused bytes, the search request 298 is modified 128 and passed 146 along. TE1, having depleted the five bytes of its current match frame, loads the second delta frame 254 of its delta stream 32. The second frame 254 is a data frame, and the search request 298 is fulfilled 134, 136 with five bytes of data 320 (COULD). As the number of data bytes is returned through the transaction chain 38, the PSP of TE2 rises 156 from five to ten.

During the third request 298 of the compiler consumer process 286, TE2 must load a new delta frame. Since the new frame 260 is a data frame, its entire contents (_B) are returned 134 to the compiler consumer process 286, and written 306 as a data frame 322 to the compiled delta stream 294.

A next request 298 of the compiler consumer process 286 causes TE2 to load the third frame 262 of its delta stream 30. Since the frame 262 is a match frame, the SMP of the frame is compared to TE2's PSP and it is determined 172 that the stream 32 prior to TE2 needs to be advanced by five bytes (15−10=5). A second search request 196, for stream bytes, is initiated in the streams 32, 34 prior to TE2. Since the current data frame 254 of TE1 can supply the entire five bytes requested in the second search 196, and fulfill the necessary advancement of TE2's PSP, the second search request 296 is terminated. The five bytes returned by TE1 (N'T_B) are written 204 into the negative delta stream 288 of TE2 in the form of a data frame 278. Having advanced its PSP to 15, TE2 records 178 the inverse of its newly loaded match frame 262 in its negative delta stream 288, reduces 128 the compiler consumer process' requested number of bytes to fifteen (the length of its current match frame 262), and passes 146 the request 298 to TE1. TE1 can supply four bytes of data (E_A_) from its current data frame 254. As the data 324 is returned to the compiler consumer process 286, TE2's PSP is incremented 156 to nineteen.

The next request 298 of the compiler consumer process 286 is passed 146 through TE2, being reduced 128 to eleven. TE1 must now load 120 a new delta frame. Since its next available frame is a match frame 256, it determines 172 that the SMP of the new frame 256 is greater than its PSP (10−5=5), and the prior stream 34 must be advanced by five bytes. Since TE0 has five bytes left in its match frame 246, and cannot supply data, an original data stream 36 reference token must be recorded 212 in the negative delta stream 290 of TE1. Upon merging the original data stream 36 with the compiled delta stream 294, the reference token recorded 212 in the negative delta stream 290 of TE1 may be filled 214 with the appropriate data from the original data stream 36. In returning the number of bytes in the reference token through the transaction chain 38, the PSP of TE0 is incremented 156 to ten, and the PSP of TE1 is incremented 156 to ten. An inverse of TE1's new match frame 256 is recorded 178 in its negative delta stream 290. Since the newly loaded match frame 256 of TE1 is longer than eleven bytes, the compiler consumer process' 286 search request 298 is passed 146, unmodified, to TE0. TE0 is required to load 120 the next frame 248 of its delta stream 34. The frame 248 is a data frame of eight bytes. The search request 298 is modified 128, and eight data bytes (RADICAL_) are returned through the transaction chain 38. The PSP of TE1 is incremented 156 to eighteen, and the PSP of TE2 is incremented 156 to twenty-seven. The eight returned data bytes are recorded 306 in the compiled delta stream 294 as a data frame 326.

An additional request 298 of the compiler consumer process 286 is reduced 128 to a request 298 for three data bytes as it is passed 146 through TE2. The request 298 for three data bytes is passed 146 through TE1 without modification. Upon reaching TE0, the search request 298 is held in abeyance as TE0 loads 120 the last frame 250 of its delta stream 34. Since the SMP of the loaded match frame 250 equals TE0's PSP (10=10), prior stream advancement does not occur. An inverse of the loaded match frame 250 is recorded 178 in TE0's negative delta stream 292. Once again, TE0 must construct 140 a match frame referencing the original data stream 36. The request 298 for three data bytes is returned to the compiler consumer process 286 unfulfilled. As it is returned, TE1's PSP rises 156 to twenty-one, and TE2's PSP rises 156 to thirty. The constructed match frame 328 is recorded 308 in the compiled delta stream 294.

The next request 298 of the compiler consumer process 286 is fulfilled with a data frame 330 representing the two bytes (T.) of a newly loaded data frame 264 of TE2.

A final request 298 of the compiler consumer process 286 is returned unfulfilled, having been reduced to zero when TE2 acknowledged 122 reaching the end of its delta stream 30. The compiler consumer process 286 has therefore completed 302 its build of the compiled delta stream 294.

As in the merge of delta streams 30, 32, 34 with an original data stream 36, when TE2 acknowledges 122 reaching the end of its delta stream 30, a ripple effect 164 is set into action which causes the other transaction elements 26, 28 to wind up 224 the reading of their own delta streams 32, 34 and complete the building of their negative delta streams 290, 292. During this process, another reference token 316, this time one referencing the last seven bytes of the original data stream 36, is recorded 204 in the negative delta stream 288 of TE2.

Although the delta streams 30, 32, 34 discussed herein have comprised delta frames referencing matching and/or added data bytes, one skilled in the art could readily use the disclosed method and apparatus 20, 332, 334 in conjunction with delta streams comprising references to matching and/or added data lines. The characters of a match frame would therefore refer to line addresses rather than byte addresses.

The above description has described a method and apparatus 20, 332, 334 for merging a sequential plurality of delta streams 30, 32, 34. Since delta streams 30, 32, 34 comprise a sequence of non-overlapping match and/or data frames, the system yields exceptional results when all streams 30, 32, 34 are stored in (and written to) sequential storage media. No other delta merging system is known to operate in an environment comprising only sequential storage media.

While illustrative and presently preferred embodiments of the method and apparatus 20, 332, 334 have been described in detail herein, it is to be understood that the disclosed concepts may be otherwise variously embodied and employed and that the appended claims are intended to be construed to include such variations except insofar as limited by the prior art.

What is claimed is:

1. In a programmable computer, a method of merging an original data stream with a sequential plurality of delta streams to build an updated data stream, the method comprising the steps of:

a) initiating a search request, within the sequential plurality of delta streams, for a number of data bytes to transfer to the updated data stream;

b) fulfilling the search request with data bytes provided by the last delta stream in the sequential plurality of delta streams which is capable of supplying data bytes;

c) if the sequential plurality of delta streams is incapable of fulfilling the search request, fulfilling the search request with data bytes provided by the original data stream; and d) repeating steps a)–c) until a search request cannot be fulfilled, and the updated data stream is complete.

2. A method as in claim 1, wherein:

a) each of the delta streams comprises a sequence of match and/or data delta frames;

b) the match frames describe matching segments of a delta stream and a prior stream in terms of byte addresses; and c) the data frames comprises data in a delta stream which does not appear in a prior stream.

3. A method as in claim 1, wherein:

a) each of the delta streams comprises a sequence of match and/or data delta frames;

b) the match frames describe matching segments of a delta stream and a prior stream in terms of line addresses; and c) the data frames comprise data in a delta stream which does not appear in a prior stream.

4. A method as in claim 1, further comprising the step of reading the original data stream directly from a sequential media.

5. A method as in claim 1, further comprising the step of writing the updated data stream to a sequential media.

6. In a programmable computer, a method of merging an original data stream with a plurality of delta streams to build an updated data stream, the method comprising the steps of:

a) constructing a chain of transaction elements corresponding to the sequential plurality of delta streams, wherein a highest numbered transaction element in the transaction chain is associated with a delta stream representing a latest revision to the original data stream, a lowest numbered transaction element in the transaction chain is associated with a delta stream representing a first revision to the original data stream, and consecutively numbered transaction elements in the transaction chain are associated with sequential revisions to the original data stream;

b) initiating a search request, within the transaction chain, for a number of data bytes to transfer to the updated data stream;

c) fulfilling the search request with data bytes provided by the highest numbered transaction element in the transaction chain capable of supplying data bytes;

d) if the transaction elements of the transaction chain are incapable of fulfilling the search request, fulfilling the search request with data bytes provided by the original data stream; and e) repeating steps a)–d) until a search request cannot be fulfilled, and the updated data stream is complete.

7. A method as in claim 6, further comprising the step of reading the original data stream directly from a sequential media.

8. A method as in claim 6, further comprising the step of writing the updated data stream to a sequential media.

9. A method as in claim 6, further comprising the step of building a sequential plurality of negative delta streams corresponding to both the transaction elements of the transaction chain and the sequential plurality of delta streams.

10. A method as in claim 6, wherein:

a) each transaction element in the transaction chain sequentially loads a sequence of match and/or data delta frames from its corresponding delta stream; and b) the search request initiated within the transaction chain is initiated within loaded delta frames of the transaction elements.

11. A method as in claim 10, wherein:

a) a match frame comprises,
  i) a beginning byte address for a segment of data in a delta stream which matches a segment of data in a prior stream; and
  ii) a source match position indicating a beginning byte address in the prior stream which corresponds to the beginning byte address in the delta stream; and b) a data frame comprises data in the delta stream which does not appear in the prior stream.

12. A method as in claim 11, further comprising the step of building a sequential plurality of negative delta streams corresponding to both the transaction elements of the transaction chain and the sequential plurality of delta streams.

13. A method as in claim 12, wherein the building of a particular negative delta stream in the sequential plurality of negative delta streams comprises the steps of:

a) monitoring a prior stream position associated with a particular transaction element;

b) when a match frame is loaded by the particular transaction element, calculating a prior stream lag count as the difference between the loaded match frame's source match position and the transaction element's prior stream position;

c) transferring a number of data bytes equaling the prior stream lag count, from streams prior to the particular transaction element, to the particular negative delta stream corresponding to the particular transaction element;

d) creating an inverse of the loaded match frame; and e) recording the inverse match frame in the particular negative delta stream corresponding to the particular transaction element.

14. A method as in claim 13, wherein the negative delta streams are attached to null devices.

15. A method as in claim 13, wherein the step of transferring a number of data bytes equaling the prior stream lag count, from streams prior to the particular transaction element, to the particular negative delta stream corresponding to the particular transaction element, comprises the steps of:

a) initiating a second search request, within the loaded delta frames of those transaction elements of the transaction chain which are prior to the particular transaction element, for a number of data bytes, equaling the prior stream lag count, to transfer, as a data frame, to the particular negative delta stream corresponding to the particular transaction element;

b) fulfilling the second search request with data bytes provided by the highest numbered transaction element in the transaction chain capable of supplying data bytes;

c) if the transaction elements of the transaction chain prior to the particular transaction element are incapable of fulfilling the second search request, fulfilling the second search request with data bytes provided by the original data stream;

d) decrementing the prior stream lag count by the number of data bytes provided in fulfilling the second search request; and e) repeating steps a)–d) until the prior stream lag count is equal to zero.

16. A method as in claim 11, wherein a loaded delta frame of a transaction element is the transaction element's current frame, and the method comprises the further steps of:

a) monitoring a number of unused bytes in the current frame of each of the transaction elements;

b) loading a next delta frame of a delta stream into the current frame of its corresponding transaction element whenever the number of unused bytes in the transaction element's current frame is determined to be zero; and c) after the above step, resetting the number of unused bytes in the current frame of the transaction element.

17. A method as in claim 16, wherein:

a) the step of initiating a search request comprises initiating the search request within the current frame of the highest numbered transaction element in the transaction chain;

b) the step of fulfilling the search request with data bytes provided by the highest numbered transaction element in the transaction chain capable of supplying data bytes, comprises the steps of:
  i) if the current frame contains fewer than the requested number of data bytes, updating the requested number of data bytes to reflect a number of data bytes in the current frame;
  ii) if the current frame is a data frame, fulfilling the search request by transferring the requested number of data bytes from the current frame to the updated data stream;
  iii) if the current frame is a match frame, and a prior delta stream exists,
    A) passing the search request to the next lower numbered transaction element in the transaction chain; and
    B) repeating the method beginning with step b)i) of this claim; and the method comprises the further step of, c) after fulfilling the search request, and for each of the transaction elements to which the search request was passed, decrementing the number of unused bytes in each of the transaction element's current frames, and, but for the transaction element which fulfilled the search request, incrementing a prior stream position of each of the transaction elements, by the number of data bytes transferred to the updated data stream during the fulfillment of the search request.

18. A method as in claim 17, further comprising the step of reading the original data stream directly from a sequential media.

19. A method as in claim 17, further comprising the step of writing the updated data stream to a sequential media.

20. A method as in claim 17, further comprising the step of building a sequential plurality of negative delta streams corresponding to both the transaction elements of the transaction chain and the sequential plurality of delta streams.

21. A method as in claim 20, wherein the building of a particular negative delta stream in the sequential plurality of negative delta streams comprises the steps of:
  a) monitoring the prior stream position associated with a particular transaction element corresponding to the particular negative delta stream;
  b) when a match frame is loaded by the particular transaction element, calculating a prior stream lag count as the difference between the match frame's source match position and the transaction element's prior stream position;
  c) transferring a number of data bytes equaling the prior stream lag count, from streams prior to the particular transaction element, to the particular negative delta stream corresponding to the particular transaction element;
  d) creating an inverse of the loaded match frame; and
  e) recording the inverse match frame in the particular negative delta stream corresponding to the particular transaction element.

22. A method as in claim 21, wherein the step of transferring a number of data bytes equaling the prior stream lag count, from streams prior to the particular transaction element, to the particular negative delta stream corresponding to the particular transaction element, comprises the steps of:
  a) initiating a second search request, within the loaded delta frames of those transaction elements of the transaction chain which are prior to the particular transaction element, for a number of data bytes, equaling the prior stream lag count, to transfer, as a data frame, to the particular negative delta stream corresponding to the particular transaction element;
  b) fulfilling the second search request with data bytes provided by the highest numbered transaction element in the transaction chain capable of supplying data bytes;
  c) if the transaction elements of the transaction chain prior to the particular transaction element are incapable of fulfilling the second search request, fulfilling the second search request with data bytes provided by the original data stream;
  d) decrementing the prior stream lag count by the number of data bytes provided in fulfilling the second search request; and
  e) repeating steps a)–d) until the prior stream lag count is equal to zero.

23. A method as in claim 22, wherein:
  a) the step of initiating a second search request comprises initiating a second search request within the current frame of the first transaction element in the transaction chain which is prior to the particular transaction element;
  b) the step of fulfilling the second search request with data bytes provided by the highest numbered transaction element in the transaction chain capable of supplying data bytes, comprises the steps of:
    i) if the current frame contains fewer than the prior stream lag count number of data bytes, updating the second requested number of data bytes to reflect a number of data bytes in the current frame;
    ii) if the current frame is a data frame, fulfilling the second search request by transferring the second requested number of data bytes from the current frame to the particular negative delta stream corresponding to the particular transaction element;
    iii) if the current frame is a match frame, and a prior delta stream exists,
      A) passing the second search request to the next lower numbered transaction element in the transaction chain; and
      B) repeating the method beginning with step b)i) of this claim; and the method comprises the further step of,
  c) after fulfilling the second search request,
    i) for each of the transaction elements in the transaction chain to which the second search request was passed, decrementing the number of unused bytes in each of the transaction element's current frames by the number of data bytes transferred to the particular negative delta stream corresponding to the particular transaction element during the fulfillment of the second search request; and
    ii) for each of the transaction elements having a numerical position in the transaction chain which is greater than the numerical position of the transaction element which fulfilled the second search request, but less than or equal to the numerical position of the particular transaction element, incrementing each of the transaction element's prior stream positions by the number of data bytes transferred to the particular negative delta stream corresponding to the particular transaction element during the fulfillment of the second search request.

24. In a programmable computer, a method of merging an updated data stream with one or more negative delta streams to reconstruct a desired prior data stream, the method comprising the steps of:
  a) constructing a chain of transaction elements corresponding to the plurality of negative delta streams, wherein a highest numbered transaction element in the transaction chain is associated with a negative delta stream representing a last required revision to the updated data stream, a lowest numbered transaction element in the transaction chain is associated with a negative delta stream representing a first required revision to the updated data stream, and consecutively numbered transaction elements in the transaction chain are associated with sequentially required revisions to the updated data stream;
  b) initiating a search request, within the transaction chain, for a number of data bytes to transfer to the desired prior data stream;

c) fulfilling the search request with data bytes provided by the highest numbered transaction element in the transaction chain capable of supplying data bytes;

d) if the transaction elements of the transaction chain are incapable of fulfilling the search request, fulfilling the search request with data bytes provided by the updated data stream; and e) repeating steps a)–d) until a search request cannot be fulfilled, and the desired prior data stream is complete.

25. In a programmable computer, a method of constructing a negative delta stream during a merge of an original data stream with a delta stream, the method comprising the steps of:

a) initiating a search request, within a current match and/or data delta frame of the delta stream, for a number of data bytes to transfer to an updated data stream;

b) if the current delta frame of the delta stream is empty, loading a next delta frame from the delta stream as the current delta frame;

c) monitoring an original data stream position associated with the delta stream;

d) after loading a next delta frame which is a match frame,
 i) calculating a prior stream lag count as the difference between the match frame's source match position and the delta stream's original data stream position;
 ii) transferring a number of bytes, equaling the prior stream lag count, from the original data stream to the negative delta stream, in the form of a data frame;
 iii) creating an inverse of the match frame;
 iv) recording the inverse match frame in the negative delta stream; and
 v) incrementing the original data stream position associated with the delta stream by a number equal to the prior stream lag count;

e) if the delta stream is capable of supplying data bytes from a current frame which is a data frame, fulfilling the search request with data bytes provided from the current frame;

f) if the delta stream is incapable of fulfilling the search request, fulfilling the search request with data bytes provided by the original data stream;

g) incrementing the original data stream position associated with the delta stream by the number of data bytes provided to the updated data stream by the original data stream; and h) repeating steps a)–g) until a search request cannot be fulfilled, and the updated data stream is complete.

26. A method as in claim 25, further comprising the step of writing the negative delta stream to a sequential media.

27. In a programmable computer, a method of merging a sequential plurality of delta streams to create a compiled delta stream, the method comprising the steps of:

a) initiating a search request, within the sequential plurality of delta streams, for a data frame to transfer to the compiled delta stream;

b) fulfilling the search request with a data frame provided by the last delta stream in the sequential plurality of delta streams which is capable of supplying a data frame;

c) if the sequential plurality of delta streams is incapable of fulfilling the search request, constructing a match frame to transfer to the compiled delta stream; and d) repeating steps a)–c) until a search request cannot be fulfilled, and the compiled delta stream is complete.

28. A method as in claim 27, wherein:
a) each of the delta streams comprises a sequence of match and/or data delta frames;
b) the match frames describe matching segments of a delta stream and a prior stream in terms of byte addresses; and
c) the data frames comprise data in a delta stream which does not appear in a prior stream.

29. A method as in claim 27, wherein:
a) each of the delta streams comprises a sequence of match and/or data delta frames;
b) the match frames describe matching segments of a delta stream and a prior stream in terms of line addresses; and
c) the data frames comprise data in a delta stream which does not appear in a prior stream.

30. A method as in claim 27, further comprising the step of reading the sequential plurality of delta streams directly from a sequential media.

31. A method as in claim 27, further comprising the step of writing the compiled delta stream to a sequential media.

32. In a programmable computer, a method of merging a sequential plurality of delta streams to create a compiled delta stream, the method comprising the steps of:

a) constructing a chain of transaction elements corresponding to the sequential plurality of delta streams, wherein a highest numbered transaction element in the transaction chain is associated with a delta stream representing a latest revision to an original data stream, a lowest numbered transaction element in the transaction chain is associated with a delta stream representing a first revision to the original data stream, and consecutively numbered transaction elements in the transaction chain are associated with sequential revisions to the original data stream;

b) initiating a search request, within the transaction chain, for a data frame to transfer to the compiled delta stream;

c) fulfilling the search request with a data frame provided by the highest numbered transaction element in the transaction chain which is capable of supplying a data frame;

d) if the transaction elements of the transaction chain are incapable of fulfilling the search request, constructing a match frame to transfer to the compiled delta stream; and e) repeating steps a)–d) until a search request cannot be fulfilled, and the compiled delta stream is complete.

33. A method as in claim 32, further comprising the step of reading the sequential plurality of delta streams directly from a sequential media.

34. A method as in claim 32, further comprising the step of writing the compiled delta stream to a sequential media.

35. A method as in claim 32, wherein:
a) each transaction element in the transaction chain sequentially loads a sequence of match and/or data delta frames from its corresponding delta stream; and
b) the search request initiated within the transaction chain is initiated within loaded delta frames of the transaction elements.

36. A method as in claim 35, wherein:
a) a match frame comprises,
 i) a beginning byte address for a segment of data in a delta stream which matches a segment of data in a prior stream; and ii) a source match position indicating a beginning byte address in the prior stream which corresponds to the beginning byte address in the delta stream; and b) a data frame comprises data in the delta stream which does not appear in the prior stream.

37. A method as in claim 36, further comprising the step of building a sequential plurality of negative delta streams corresponding to both the transaction elements of the transaction chain and the sequential plurality of delta streams.

38. A method as in claim 37, wherein the building of a particular negative delta stream in the sequential plurality of negative delta streams, comprises the steps of:
   a) monitoring a prior stream position associated with a particular element in the transaction chain;
   c) when a match frame is loaded by the particular transaction element, calculating a prior stream lag count as the difference between the match frame's source match position and the transaction element's prior stream position;
   d) transferring representations of a number of bytes equaling the prior stream lag count, from streams prior to the particular transaction element, to the particular negative delta stream corresponding to the particular transaction element;
   e) creating an inverse of the loaded match frame; and
   f) recording the inverse match frame in the particular negative delta stream corresponding to the particular transaction element.

39. A method as in claim 38, wherein the negative delta streams are attached to null devices.

40. A method as in claim 38, wherein the step of transferring representations of a number of bytes equaling the prior stream lag count, from streams prior to the particular transaction element, to the particular negative delta stream corresponding to the particular transaction element, comprises the steps of:
   a) initiating a second search request, within the loaded delta frames of those transaction elements of the transaction chain which are prior to the particular transaction element for a number of data bytes, equaling the prior stream lag count, to transfer to a data frame of the particular negative delta stream associated with the particular transaction element;
   b) fulfilling the second search request with data bytes provided by the highest numbered transaction element in the transaction chain capable of supplying data bytes;
   c) if the transaction elements of the transaction chain prior to the particular transaction element are incapable of fulfilling the second search request, fulfilling the second search request with a match frame referencing the original data stream;
   d) decrementing the prior stream lag count by the number of data bytes provided in fulfilling the second search request; and
   e) repeating steps a)-d) until the prior stream lag count is equal to zero.

41. A computer programmed to merge a sequential plurality of delta streams with an original data stream, in a single pass, to create an updated data stream, the computer comprising:
   a) a transaction chain comprising a plurality of sequenced transaction elements, wherein each transaction element has a delta stream input corresponding to one of the sequential plurality of delta streams; and
   b) a consumer process, connected to a trailing element of the transaction chain, and comprising an input for the original data stream and an output for the updated data stream.

42. A computer as in claim 41, wherein each of the transaction elements further comprise:
   a) a delta stream reader;
   b) a prior transaction element index;
   c) a prior stream position monitor;
   d) a current frame buffer; and
   e) a search request fulfillment I/O interface.

43. A computer as in claim 42, wherein each of the transaction elements further comprises a negative delta stream writer.

44. A computer programmed to merge a sequential plurality of negative delta streams with an updated data stream, in a single pass, to reconstruct a desired prior data stream, the computer comprising:
   a) a transaction chain comprising a plurality of sequenced transaction elements, wherein each transaction element has a negative delta stream input corresponding to one of the sequential plurality of negative delta streams; and
   b) a consumer process, connected to a trailing element of the transaction chain, and comprising an input for the updated data stream and an output for the desired prior data stream.

45. A computer as in claim 44, wherein each of the transaction elements further comprises:
   a) a negative delta stream reader;
   b) a prior transaction element index;
   c) a prior stream position monitor;
   d) a current frame buffer; and
   e) a search request fulfillment I/O interface.

46. A computer programmed to merge a sequential plurality of delta streams, in a single pass, to create a compiled delta stream, the computer comprising:
   a) a transaction chain comprising a plurality of sequenced transaction elements, wherein each transaction element has a delta stream input corresponding to one of the sequential plurality of delta streams; and
   b) a compiler consumer process, connected to a trailing element of the transaction chain, comprising an output for the compiled delta stream.

47. A computer as in claim 46, wherein each of the transaction elements further comprises:
   a) a delta stream reader;
   b) a prior transaction element index;
   c) a prior stream position monitor;
   d) a current frame buffer; and
   e) a search request fulfillment I/O interface.

48. A computer as in claim 47, wherein each of the transaction elements further comprises a negative delta stream writer.

49. A physical storage media programmed to control a computer in merging a sequential plurality of delta streams with an original data stream, in a single pass, to create an updated data stream, the media comprising:
   a) means to produce a transaction chain comprising a plurality of sequenced transaction elements, wherein each transaction element has a delta stream input corresponding to one of the sequential plurality of delta streams;

b) a consumer process comprising an input for the original data stream and an output for the updated data stream; and c) means to connect the consumer process to a trailing element of the transaction chain.

50. A physical storage media as in claim 49, wherein the means to produce a transaction chain comprises means to produce:

a) a delta stream reader;

b) a prior transaction element index;

c) a prior stream position monitor;

d) a current frame buffer; and e) a search request fulfillment I/O interface, for each of the transaction elements.

51. A physical storage media as in claim 50, wherein the means to produce a transaction chain comprises means to produce a negative delta stream writer for each of the transaction elements.

52. A physical storage media programmed to control a computer in merging a sequential plurality of negative delta streams with an updated data stream, in a single pass, to create a desired prior data stream, the media comprising:

a) means to produce a transaction chain comprising a plurality of sequenced transaction elements, wherein each transaction element has a negative delta stream input corresponding to one of the sequential plurality of negative delta streams;

b) a consumer process comprising an input for the updated data stream and an output for the previous data stream; and c) means to connect the consumer process to a trailing element of the transaction chain.

53. A physical storage media as in claim 52, wherein the means to produce a transaction chain comprises means to produce:

a) a negative delta stream reader;

b) a prior transaction element index;

c) a prior stream position monitor;

d) a current frame buffer; and e) a search request fulfillment I/O interface, for each of the transaction elements.

54. A physical storage media programmed to control a computer in merging a sequential plurality of delta streams, in a single pass, to create a compiled delta stream, the media comprising:

a) means to produce a transaction chain comprising a plurality of sequenced transaction elements, wherein each transaction element has a delta stream input corresponding to one of the sequential plurality of delta streams;

b) a compiler consumer process comprising an output for the compiled delta stream; and c) means to connect the compiler consumer process to a trailing element of the transaction chain.

55. A physical storage media as in claim 54, wherein the means to produce a transaction chain comprises means to produce:

a) a delta stream reader;

b) a prior transaction element index;

c) a prior stream position monitor;

d) a current frame buffer; and e) a search request fulfillment I/O interface, for each of the transaction elements.

56. A physical storage media as in claim 55, wherein the means to produce a transaction chain comprises means to produce a negative delta stream writer for each of the transaction elements.

* * * * *